US006486888B1

United States Patent
Fushiki et al.

(10) Patent No.: US 6,486,888 B1
(45) Date of Patent: Nov. 26, 2002

(54) ALPHA REGIONS

(75) Inventors: Ikko Fushiki, Redmond, WA (US); Hock S. Lee, Redmond, WA (US); J. Andrew Goossen, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/385,665

(22) Filed: Aug. 26, 1999

Related U.S. Application Data

(63) Continuation of application No. 09/382,270, filed on Aug. 24, 1999.

(51) Int. Cl.$^7$ .............................. G06T 7/00; G06T 11/60
(52) U.S. Cl. ........................................ 345/592; 345/631
(58) Field of Search ............................... 345/592, 629, 345/631, 634, 555; 382/245

(56) References Cited

U.S. PATENT DOCUMENTS

| | | |
|---|---|---|
| 4,524,421 A | 6/1985 | Searby et al. |
| 4,602,286 A | 7/1986 | Kellar et al. |
| 5,216,755 A | 6/1993 | Walker et al. |
| 5,289,566 A | 2/1994 | Walker et al. |
| 5,459,529 A | 10/1995 | Searby et al. |
| 5,682,469 A | 10/1997 | Linnett et al. |
| 5,745,095 A | 4/1998 | Parchem et al. |
| 5,748,789 A | 5/1998 | Lee et al. |
| 5,883,678 A | 3/1999 | Yamaguchi et al. |
| 5,983,190 A | 11/1999 | Trower, II et al. |
| 5,999,189 A | 12/1999 | Kajiya et al. |

OTHER PUBLICATIONS

Cheol–Hi Lee et al., Template–Based Rendering of Run–Length Encoded Volumes, 1997, IEEE The Fifth Pacific Conference on Computer Graphics and Applications, pp. 138–147.*

Packard, X Nonrectangular Window Shape Extension Library, Version 1.0, X Consortium Standard, X Version 11, Release 6.4, 1989.
Neider, "Blending," *OpenGL Programming Guide*, pp. 1–9, 1994.
MSDN Library CD, "Class Region," pp. 1–12, Jul. 1998.
MSDN Library CD, "C (glossary)," p. 1, Jul. 1998.
MSDN Library CD, "Region Creation and Selection," p. 1, Jul. 1998.
MSDN Library CD, "Regions," p. 1, Jul. 1998.
MSDN Library CD, "Region Structures," p. 1, Jul. 1998.
MSDN Library CD, "RGNDATA," p. 1, Jul. 1998.
MSDN Library CD, "RGNDATAHEADER," p. 1, Jul. 1998.

(List continued on next page.)

*Primary Examiner*—Jeffery Brier
(74) *Attorney, Agent, or Firm*—Klarquist Sparkman, LLP

(57) ABSTRACT

An image storage and processing method constructs, clips, fills, and combines arbitrary 2-dimensional shapes in an advanced graphics system. The method supports processing of anti-aliased images by compressing the image into a novel AlphaRegion data structure. AlphaRegion encodes into the data structure both the partially transparent as well as the fully opaque alpha values of an image according to rectangular bands. A band is a contiguous series of scan lines that have the same pattern of alpha values in a single direction. AlphaRegion encoding results in a more compact representation than possible in a conventional bitmap, but without losing the anti-aliasing features. AlphaRegion can be constructed either by supersampling sub-scan lines of an image, from the scan lines of a gray-scale image, from an existing conventional 1-bit Region or alpha mask buffer, or directly from a scan-line conversion of a geometric shape. AlphaRegion stores image data into three arrays, yInfo, xInfo and alphaData. Methods provided with AlphaRegion include rendering methods for filling or clipping the area on the drawing surface and methods for combining two AlphaRegions using boolean combination operators OR, AND, XOR, SUBTRACT, or SUBTRACT_FROM.

37 Claims, 12 Drawing Sheets

OTHER PUBLICATIONS

Lee, "Imaging for the Internet," *Web Techniques,* http://www.webtechniques.com/archives/1996/12/lee/, pp. 1–10, Dec. 1996.

"K1 Image FAQ," Khoral Research, Inc., Version 2.001, pp. 1–13, Aug. 12, 1995.

"History of User–Visible Changes," ftp://ftp.x.org/contrib/window_managers/gwm/CHANGES, pp. 1–33, Dec. 8, 1995.

Lurie, "Preview", *Microsoft Interactive Developer Column,* pp. 1–6, Feb. 1997.

"2927 How to Create Non–rectangular Windows," http://www.xploiter.com/programming/c/borland/2927.html, pp. 1–3, Jun. 12, 1996.

Porter et al., "Compositing Digital Images," *Computer Graphics* 18 (3): 253–259, Jul. 1984.

MSDN Library CD, "AREA," pp. 1–2, Jul. 1998.

MSDN Library CD, "AREA," p. 1, Jul. 1998.

MSDN Library CD, "shape," pp. 1–2, Jul. 1998.

MSDN Library CD, "MAP," pp. 1–2, Jul. 1998.

MSDN Library CD, "IMG," pp. 1–3, Jul. 1998.

MSDN Library CD, "Bitmaps with Transparency," pp. 1–7, Jul. 1998.

MSDN Library CD, "What is a Sprite?," pp. 1–2, Jul. 1998.

Crochemore et al., "Pattern Matching and Text Compression Algorithms," *The Computer Science and Engineering Handbook,* Tucker (ed.), pp. 162–202, 1997.

* cited by examiner

|   | X1 | X2 | X3 | X4 | X5 | X6 |   |
|---|----|----|----|----|----|----|---|
| 0 | 0  | 0  | 0  | 0  | 0  | 0  | 0 |
| 0 | 0  | 1  | 1  | 1  | 1  | 0  | 0 |
| 0 | 0  | 1  | 1  | 1  | 1  | 0  | 0 |
| 0 | 0  | 0  | 1  | 1  | 0  | 0  | 0 |
| 0 | 0  | 1  | 1  | 1  | 1  | 0  | 0 |
| 0 | 1  | 1  | 0  | 0  | 1  | 1  | 0 |
| 0 | 1  | 1  | 0  | 0  | 1  | 1  | 0 |
| 0 | 0  | 0  | 0  | 0  | 0  | 0  | 0 |

$Y_1$ = (x2, x5)           H = 2
$Y_2$ = (x3, x4)           H = 1
$Y_3$ = (x2, x5)           H = 1
$Y_4$ = (x1, x2), (x5, X6)  H = 2

150 — REGION

FIG. 1 (Prior Art)

|   | 1 | 2 | 3 | 4 | 5 | 6 | 7 | 8 | 9 | 10 | 11 | 12 |
|---|---|---|---|---|---|---|---|---|---|----|----|----|
|   |   | X | X |   | X | X | X | X |   | X  |    |    |
|   |   | X |   |   | X | X | X | X |   | X  | X  |    |
|   |   | X | X | X | X | X | X | X |   | X  |    |    |
|   |   | X | X |   | X | X | X | X |   | X  | X  |    |

510

531 —
scan1 = (2, 2), (5, 4), (10, 1)
scan2 = (2, 1), (5, 4), (10, 2)
scan3 = (2, 3), (5, 4), (10, 1)
scan4 = (2, 2), (5, 4), (10, 2)

532 — scanOR = (2,7), (10, 2)
533 — scanAND = (2,1), (5, 4), (10, 1)

534 — scanOR' = (1, 12)
535 — scanAND' = (5, 4)

536 — scanTrans = scanOR' - scanAND' = (1, 4), (9, 4)
537 — scanOpaque = scanAND' = (5, 4)

| | 0 | 1 | 2 | 3 | 4 | 5 | 6 | 7 | 8 | 9 | 10 | 11 |
|---|---|---|---|---|---|---|---|---|---|---|---|---|
| 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 | 0 |
| 3 | 0 | 0 | 0 | 150 | 150 | 0 | 0 | 0 | 0 | 0 | 0 | 0 |
| 4 | 0 | 0 | 0 | 150 | 200 | 255 | 255 | 100 | 0 | 0 | 0 | 0 |
| 5 | 0 | 0 | 0 | 150 | 225 | 255 | 255 | 150 | 150 | 0 | 0 | 0 |
| 6 | 0 | 0 | 100 | 125 | 150 | 255 | 255 | 200 | 150 | 100 | 0 | 0 |
| 7 | 0 | 0 | 0 | 100 | 125 | 255 | 150 | 225 | 125 | 0 | 0 | 0 |
| 8 | 0 | 0 | 0 | 100 | 150 | 0 | 0 | 150 | 100 | 0 | 0 | 0 |
| 9 | 0 | 0 | 0 | 0 | 150 | 0 | 0 | 150 | 100 | 0 | 0 | 0 |
| 10 | 0 | 0 | 0 | 0 | 100 | 150 | 150 | 100 | 0 | 0 | 0 | 0 |
| 11 | 0 | 0 | 0 | 0 | 0 | 100 | 100 | 0 | 0 | 0 | 0 | 0 | ylnfo Array yInfo0= 9, 38, 24, 0
yInfo1= 1, 0, 0, 0
yInfo2= 2, 1, 4, 4, 6
yInfo3= 3, 1, 12, 10
yInfo4= 4, 2, 12, 14
yInfo5= 6, 1, 20, 14
yInfo6= 7, 1, 28, 14
yInfo7= 8, 2, 32, 20
yInfo8= 10, 1, 0, 20
yInfo9= 11, 1, 0, 0 xlnfo Array xInfo=1, 4, 4, -4,
3, 2, 4, -1, 5, 2, 7, -1,
3, 4, 3, -2, 5, 2, 7, -2,
3, 6, 3, -3, 5, 2, 7, -3,
1, 6, 3, -6,
2, 4, 3, -2, 7, -2 alphaData Array aData= 100, 100, 100, 100,
150, 150,
150, 200, 200, 150,
150, 225, 225, 150,
150, 225, 150, 150, 125, 100,
100, 125, 150, 150, 125, 100,
100, 150, 150, 100

OPERATIONS OF ALPHA REGION

ALPHA REGIONS

This patent application claims priority to and is a continuation of Fushiki et al., U.S. patent application Ser. No. 09/382,270, filed Aug. 24, 1999, entitled "ALPHA REGIONS."

TECHNICAL FIELD

The invention relates to image storage and processing in computers, and more specifically relates to storing and processing images of arbitrary 2-dimensional shapes in a graphics system that supports anti-aliasing.

BACKGROUND OF THE INVENTION

Most modern computer graphics systems today use raster graphics to display images. A raster graphics system displays an image as a raster grid, where each line of the grid is composed of a row of pixels. The image may be stored as a 2-dimensional array of values, where each row of the array corresponds to a grid line of pixels, and each value of the array represents the data associated with a particular pixel. The image can then be processed via the array, and converted back into scan lines for display on the raster grid. As the capability of graphics systems increase, more complex images are created, with a corresponding increase in the complexity of storing and processing those images.

Most operating systems, therefore, have specially designed graphics subsystems that have been developed to address the problems inherent in creating, manipulating (define, clip, fill, draw and combine), and storing images as files in computer memory. For example, in the Microsoft Windows- operating systems, the subsystem that controls the display of text and graphics is called the Graphics Device Interface (GDI). GDI functionality is provided through an application programming interface (API) that includes functions to create graphical objects and manipulate those objects in memory. GDI draws lines, curves, closed figures, text, and bitmapped images on display devices and printers. There are a number of methods that have been developed in GDI and in other graphics subsystems for manipulating complex images. None, however, have all of the desirable characteristics of a method for storing and processing images of arbitrary 2-dimensional shapes, including compact storage requirements, scan-conversion efficiency and support for anti-aliasing.

Compact storage of the image is desirable since images of arbitrary 2-dimensional shapes tend to be very large collections of data. One way to represent an image of an arbitrary 2-dimensional shape in memory is with a binary mask, which is a 2-dimensional array of binary values that simply indicate the presence or absence of the shape. This type of representation requires a relatively small amount of memory by today's standards (only 128,000 bytes with a resolution of 1024×1024 pixels). For anti-aliased images, however, the data representing an image of an arbitrary 2-dimensional shape is more complex, requiring non-binary values to be stored for each pixel. These non-binary values represent the opacity of the pixel, and are referred to as alpha values. Storing alpha values requires significantly more bits per pixel to accurately represent the image in memory.

Scan-conversion efficiency is desirable since scan-conversion of an image stored in memory is computationally intensive. Moreover, every time an image is moved or re-sized on the drawing surface, the entire primitive comprising the image must be scan-converted anew.

Lastly, support for anti-aliasing is desirable because most graphics subsystems today employ anti-aliasing techniques. Aliasing results in the appearance of "jaggies" or "staircasing", usually at the edges of the primitives of the image. These undesirable characteristics are common because most shapes can only be approximated with pixels on the raster grid. Although the use of anti-aliasing techniques improves the appearance of the image, it does so by altering the opacity of pixels at the image's boundaries. The alpha values associated with those pixels can range from fully transparent to fully opaque. A fully transparent pixel is represented by a value of 0, whereas a fully opaque pixel may be represented by a value of 255 for 8-bit alpha values, or, more generally, by a value of $2^n-1$ for n-bit alpha values. A range of alpha values may even be represented as floating values between 0 and 1. A semi-transparent pixel is represented by those values in between. The presence of a range of alpha values associated with the image not only increases the image's complexity, but makes it more difficult to process using existing methodology.

For example, one method of storing image data that is well-known in the art is run-length encoding. As described in Foley, et al., Computer Graphics Principles and Practice, Second Edition, run-length encoding is used for images having a great deal of repetition. It consists of encoding a count of the number of contiguous pixels having the same value, and the value itself. One example of an improvement on this basic idea is the assignment of a negative count to indicate that n-pixels' worth of unencoded data follow.

Another method of storing image data is to use a Region. A Region is a graphical object that subdivides an arbitrary 2-dimensional shape into a series of rectangular areas. The notion of a Region was developed for the graphics subsystems in the Macintosh and Microsoft Windowso operating systems to more easily store and process arbitrary 2-dimensional shapes.

An example of a prior art Region (150) is illustrated in FIG. 1. Since a Region was originally designed to accommodate only shapes displayed as simple opaque images, the image data structure of Region is based on an image of an arbitrary 2-dimensional shape expressed as a grid of binary values, e.g. 0 and 1, where the value 0 represents a transparent pixel (absence of the shape), and the value 1 represents an opaque pixel (presence of the shape). In the example shown in FIG. 1, an arbitrary 2-dimensional shape is subdivided into an 8×8 grid of pixels (110). Instead of using a 2-dimensional array to literally store the value of each pixel, or using run-length encoding to store the counts and values of the pixels, a Region stores the image data according to the rectangular coordinates of the shape on the grid (110). The rectangular coordinates consist of the number of rows, e.g. Y1, Y2, etc. (120), having identical patterns of Is and Os in the x-direction, the start and stop locations of those patterns in the x-direction, e.g. X1, X2, etc. (130) and the height of the rows having identical patterns, e.g. H1, H2, etc (140) (where height is equal to the number of rows). Thus, a great deal of the redundancy in storing the image is eliminated, and enables a Region (150) to store an arbitrary 2-dimensional shape in a more compact form. A Region also provides for efficient scan-conversion of the stored image.

A major drawback to using a Region, however, is the inability to store and process images having non-binary values associated with the pixels of the image. For example, anti-aliased images typically have non-binary alpha values associated with the pixels at the edges of the arbitrary shape. These non-binary alpha values represent the semi-transparent pixels in the boundaries between the fully transparent and opaque areas present in anti-aliased images. But a Region can only store the fully opaque and fully transparent areas. Thus, the structure of a Region makes it incapable of storing the semi-transparent areas. Moreover, the proper functioning of the combination operations provided for Regions depend upon limiting the representation of a shape to only fully opaque or fully transparent areas. Thus, the combination operations provided for Regions are unavailable for use with anti-aliased images.

As graphics subsystems advance, support for anti-aliased images is critical. Hence, a new approach to storing and processing images is desirable, but without sacrificing the compactness in storage requirements or the efficiency in scan-conversion rates achieved by using a Region.

SUMMARY OF THE INVENTION

The invention provides an improved method for storing and processing images of arbitrary 2-dimensional shapes in a graphics subsystem that supports anti-aliasing. The method employs a novel graphics object implemented as an AlphaRegion. The data in an AlphaRegion is stored in an alpha image data structure that is capable of representing an anti-aliased image of an arbitrary 2-dimensional shape in a manner not possible using existing structures such as the Region's image data structure. While the method is implemented in software program modules, it can also be implemented in digital hardware logic or in a combination of hardware and software components.

In the implementation, an AlphaRegion defines an arbitrary 2-dimensional shape as a series of rectangular areas. Instead of storing the rectangular coordinates of the areas, an AlphaRegion stores the information according to the y-bands. A y-band represents a set of contiguous rows of pixels within a rectangular area that all have the same pattern of opacity levels in the x-direction, identified in an AlphaRegion as an x-pattern.

In an alternative implementation, an AlphaRegion can store the information according to the x-bands, where an x-band represents a set of contiguous columns of pixels within a rectangular area that all have the same pattern of opacity levels in the y-direction, identified in an AlphaRegion as a y-pattern. For simplicity, an AlphaRegion is described in terms of storing the information horizontally only, according to the y-bands. However, storage of the information by vertically decomposing an AlphaRegion into columns instead of rows would work equally well.

Either way, completely transparent rows or columns, as the case may be, are considered outside of an AlphaRegion and are not recorded. Each x-pattern of the rows (or y-pattern of the columns), that are recorded is classified as opaque, transparent, or semi-transparent according to the alpha values appearing in the x-pattern. Furthermore, the alpha values of only the first occurrence of a recurring x-pattern (or y-pattern) is recorded.

Each span of purely opaque or purely semi-transparent pixels appearing within an x-pattern is recorded according to its starting location and width, and is identified in AlphaRegion as an x-span. The alpha values of only the semi-transparent x-spans within a particular x-pattern are recorded; the opaque x-spans are simply assumed as the default value. In this way, AlphaRegion eliminates as much redundancy in the recorded data as possible. Once recorded, the data in an AlphaRegion is easily used to reconstruct the shape for scan-conversion and display. More importantly, since the alpha values are stored in the AlphaRegion itself, the compressed AlphaRegion data may be used directly in graphical operations to combine or render the shapes without reference to separately stored alpha values.

The method of the invention implements numerous functions to construct AlphaRegion's alpha image data structure from a variety of image data sources. For example, an AlphaRegion's alpha image data structure may be created directly from various primitive shapes including a rectangle, ellipse, polygon, or path, using the methods supplied in the AlphaRegion class itself. Another implementation constructs an AlphaRegion's alpha image data structure from a previously encoded super-sampled conventional 1-bit Region or from a super-sampled bitmap. The alpha values for each of these images is derived by the method of constructing the AlphaRegion. Alternatively, in yet another implementation, an AlphaRegion's alpha image data structure can also be constructed from an alpha-mask, where an alpha-mask is a literal representation of the alpha values associated with an image of an arbitrary 2-dimensional shape stored in memory. In this implementation, the alpha values are contained in the image data source itself. Therefore, this type of an AlphaRegion can essentially be used as a compact form of an alpha-mask.

AlphaRegions can potentially be constructed via other means as well. For example, an AlphaRegion could be constructed directly from a scan-line conversion of a geometric shape. Regardless of the method of construction, an implementation of an AlphaRegion records information about the shape into a compact form by structuring the alpha image data into three arrays. The first array, yInfo, contains the data representing the number and location of the y-bands, the second array, xInfo, contains the data representing the number and location of the x-patterns, and the third array, alphaData, contains the data representing the alpha values of the semi-transparent x-spans in the x-patterns.

The methods of AlphaRegion employ techniques to construct an optimized representation of a given image. Thus, implementations of the methods may include variations in representing the data depending upon the characteristics of the image. For example, an image may have an x-pattern with a single opaque pixel surrounded by semi-transparent pixels. In that case, the implementation of the method of AlphaRegion combines the opaque single-pixel x-span with the surrounding semi-transparent x-spans to create one semi-transparent x-span. The combination of x-spans will increase efficiency both in the use of memory and in the performance of graphical operations, such as filling. In an alternative implementation, the creator of a particular instance of an AlphaRegion may dictate the definition, taking into consideration the characteristics of the image being represented.

The method of the invention not only stores the anti-aliased image data in the AlphaRegion's alpha image data structure, but implements numerous functions to process an AlphaRegion, including functions to combine two AlphaRegions, and to clip, fill or render an AlphaRegion on the drawing surface. For example, once constructed, a shape represented in an AlphaRegion's alpha image data structure may be rendered by performing a filling method on the AlphaRegion to recreate the shape on the drawing surface. Two AlphaRegions representing different shapes may be combined using one of the combination operators AND, OR, XOR, SUBTRACT and SUBTRACT_FROM. Moreover, shapes constructed in an AlphaRegion are capable of being used in clipping, masking and source-over drawing operations. An AlphaRegion is implemented as a class object with methods for constructing and deconstructing, recording, rendering and combining the objects.

The method implements image storage and processing most efficiently for images that are relatively flat, with small anti-aliased boundaries. Since not all images will be flat, implementations of the method may include other features to increase the flexibility of the application of an AlphaRegion. For example, a particular image may have an overall gradient of opacity levels resulting in a large number of semi-transparent pixels evenly distributed throughout the y-bands of an AlphaRegion, and not just in the boundary area. In that case, the memory savings resulting from the implementation of AlphaRegion may be negligible, and the alpha mask may be used instead. Thus, one feature of the invention is to be able to selectively apply an AlphaRegion so as to optimize its use in conjunction with other recognized methods of storing and manipulating images.

Further advantages and features of the invention will become apparent in the following detailed description and accompanying drawings.

BRIEF DESCRIPTION OF THE DRAWINGS

FIG. 1 is an illustration of the encoding of an arbitrary two-dimensional aliased shape into a prior art image data structure referred to as a Region.

FIG. 5C is a more detailed illustration of an implementation of nverting a conventional 1-bit super-sampled Region, as shown in FIG. 5A, into an phaRegion.

FIG. 7 is an example implementation of representing an image of an bitrary 2-dimensional shape in an alpha mask buffer in the alpha image data ructure of AlphaRegion.

DETAILED DESCRIPTION

Overview

Figure 2:
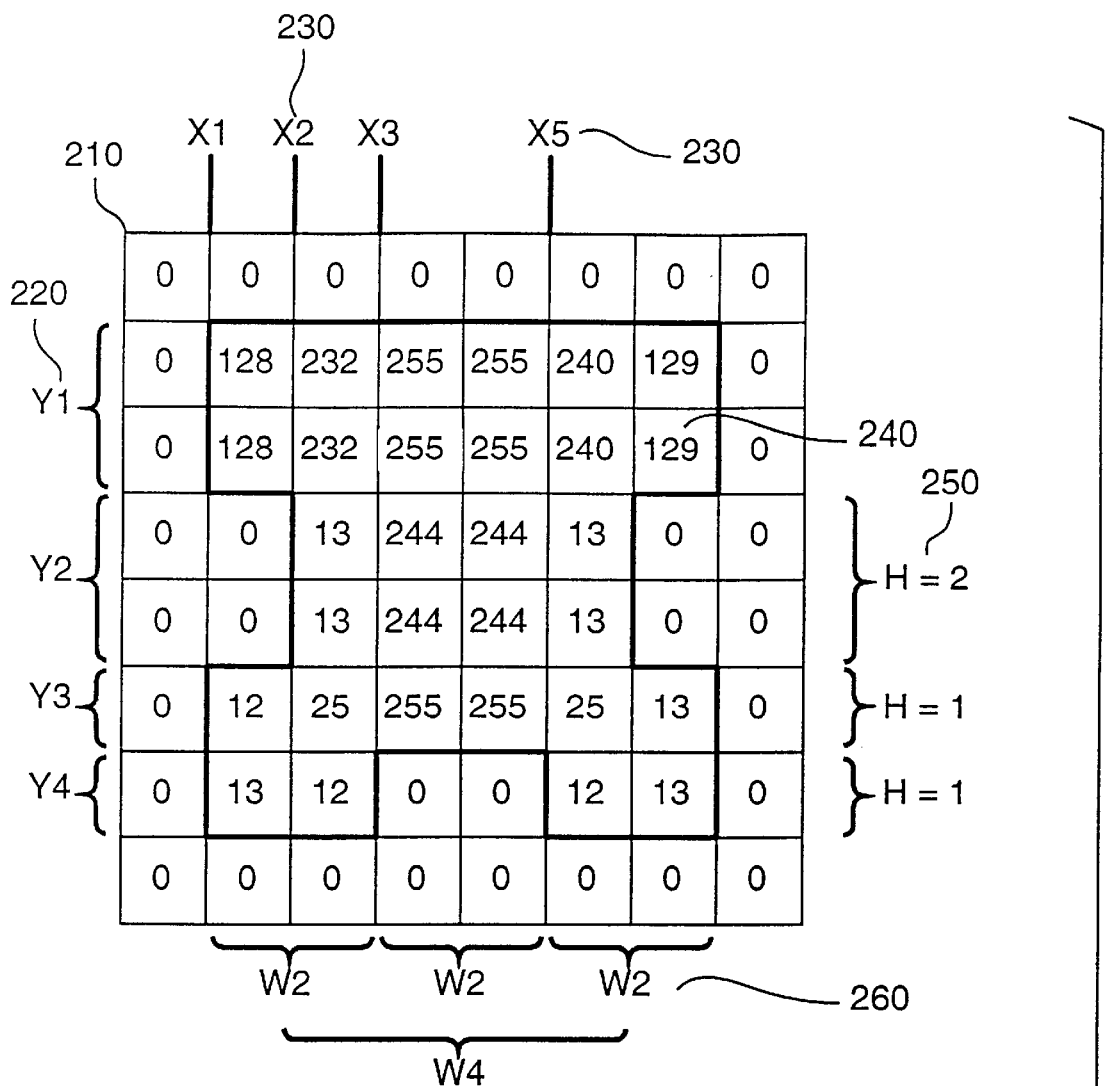
FIG. 2 is an illustration of an implementation of the encoding of an arbitrary two-dimensional anti-aliased shape into an alpha image data structure of a graphics object of the present invention, referred to as an AlphaRegion.

The following sections describe an improved method for storing and processing arbitrary 2-dimensional shapes in an advanced graphics system supporting anti-aliasing. The method assumes that the shape is comprised of a grid of pixels with gradations in opacity levels, from fully transparent to semi-transparent to fully opaque. Referring to FIG. 2, an example of such an 8×8 grid of pixels (210) is illustrated. The goal of the method is to record data representing the shape in a compact form that can be efficiently scan-converted and processed using operations that support anti-aliasing.

Logically, an arbitrary 2-dimensional shape could be represented in computer memory as simply a 2-dimensional array. Limitations in computational speed and memory size, however, dictate otherwise. An image is generally made up of patterns of color and intensity with certain characteristic features, such as the transparency or opacity of the image or parts of the image. Most methods of processing images in advanced graphics systems take advantage of this phenomenon by identifying patterns and eliminating predictable redundant data wherever possible. Unlike other image storage and processing methods that employ existing known memory structures and image compression techniques, the improved method of the invention employs a novel alpha image memory structure in a graphics object referred to as an AlphaRegion.

Before describing an implementation of an AlphaRegion, it is helpful to begin with a series of definitions used throughout the rest of the description. For simplicity, an AlphaRegion is described in terms of storing the information horizontally. It will be understood, however, that an AlphaRegion could just as easily be described in terms of storing the information vertically (e.g., into "x-bands" instead of "y-bands," "columns" instead of "rows," and "y-patterns" instead of "x-patterns.").

Definition 1 y-band:

A y-band refers to a rectangular area of the arbitrary 2-dimensional shape. Specifically, a y-band is one or more adjacent rows of pixels, each having an identical pattern of pixels in the x-direction. The patterns are determined not only by a pixel's location, but also by a pixel's opacity level, also referred to as its alpha value (see Definition 7 alpha value).

Definition 2 x-pattern:

An x-pattern refers to the pattern of a row of pixels in a y-band, where the pattern is determined by the location of the pixels and their alpha values. The starting location of an x-pattern is the left-most pixel in the row having a semi-transparent or fully opaque alpha value (non-zero). Likewise, the ending location of an x-pattern is the right-most pixel in the row having a semi-transparent or fully opaque alpha value.

Definition 3 x-span:

An x-span refers to a span of pixels in an x-pattern having alpha values that are all semi-transparent (e.g. greater than 0, but less than 255, for 8-bit alpha values) or all opaque (e.g. 255, for 8-bit alpha values). An x-span is defined by a pair of values for the starting location of the x-span and its width. There may be one or more x-spans, also referred to as a series of x-spans, in each x-pattern.

Definition 4 yInfo:

yInfo is an array containing data about the y-bands. In the illustrated implementation, the first several elements of the array specify certain data representing the characteristics of the arbitrary 2-dimensional shape, including the total number of y-bands constructed from the shape, the total number of xInfo elements in the corresponding xInfo array (Definition 5) and the total number of alphaData elements in the corresponding alphaData array (Definition 6). The subsequent elements of the yInfo array contain four sub-elements:

the starting location of the y-band, defined as the y-coordinate of the lowest row in the y-band;

the height of the y-band, defined as the number of rows contained in the y-band;

the offset to the element of the xInfo array (Definition 5) that contains data about the x-span value pairs in the y-band's x-pattern; and the offset to the element of the alphaData array (Definition 6) that contains data about the semi-transparent alpha values in the y-band's x-pattern.

Definition 5 xInfo:

xinfo is an array containing data about the x-patterns contained in the y-bands. In the illustrated implementation, each x-pattern is represented in xinfo as a series of pairs of values, where each pair represents an x-span identified in the x-pattern. The first value in the pair contains the x-span starting location, and the second value in the pair contains the x-span width. Each x-pattern series of x-spans is preceded by xInfo elements that contain the total number of x-spans and the total number of semi-transparent pixels (i.e. alpha values) identified in the x-pattern. Typically, the same x-pattern series appears in more than one y-band. Therefore, the x-pattern series is recorded only once in xinfo, and all y-bands having the same x-pattern series of x-spans point to the same xInfo array elements by using the same xInfo offset in the y-band's yInfo data.

Definition 6 alphaData:

alphaData is an array containing data about the alpha values of the semi-transparent pixels in the x-patterns. The elements of the array contain sequences of alpha values that correspond to the semi-transparent x-spans in an x-pattern of the y-band. Typically, the same sequence appears in more than one y-band. Therefore, the sequence is recorded once in alphaData, and all y-bands having the same sequence of semi-transparent alpha values point to that sequence using the same alphaData offset in the y-band's yInfo data. Note that the opaque x-spans are not recorded in the alphaData array; rather, the opaque alpha value (e.g. 255, for an 8-bit alpha value) is assumed as the default value. The default opaque alpha value is different for each different n-bit alpha value.

Definition 7 alpha value:

An alpha value is simply an integer that quantifies the opacity of a pixel. It is sometimes referred to as a coverage value. In the illustrated implementations, the alpha value of each pixel is expressed as an 8-bit number which ranges from 0 to 255. A 0 value indicates the pixel is fully transparent, whereas a value of 255 indicates the pixel is opaque. For alpha values expressed as n-bit numbers, the values may range from 0 to $2^n-1$, and as floating numbers, from 0 to 1. The values in between are referred to as semi-transparent or half-transparent. Alpha values are important in processing color and anti-aliased images, since they determine the value of a pixel composited from two separate images.

Example Implementation

The following sections describe a specific implementations of a method of the present invention for storing and processing an arbitrary 2-dimensional shape in a graphics subsystem that supports anti-aliasing in more detail.

Constructing An AlphaRegion From Sources Without Alpha Values

Figure 3A:
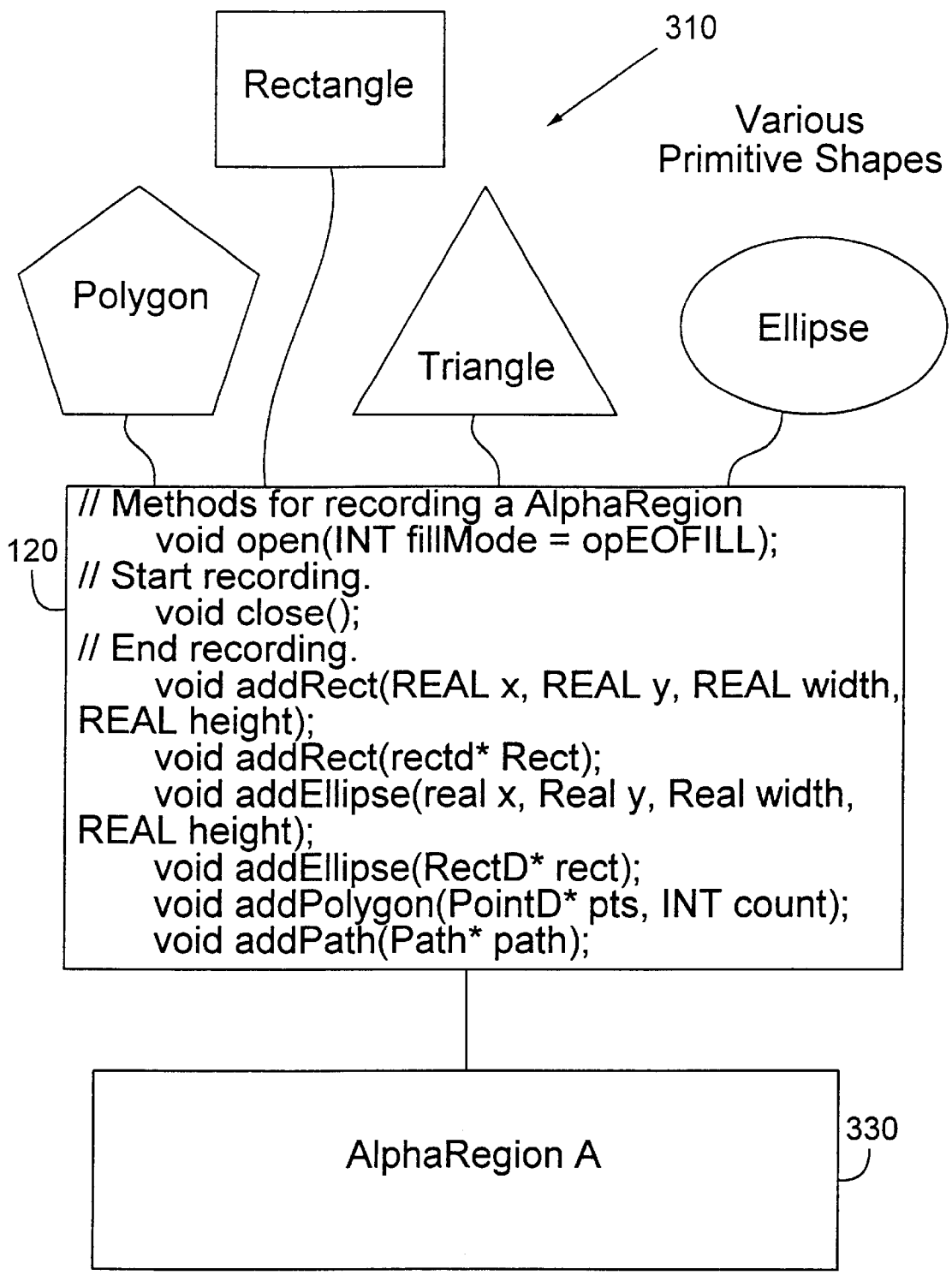
FIG. 3A is a block diagram illustrating an implementation of methods of recording AlphaRegion from various primitives of an arbitrary 2-dimensional shape.

There are several approaches to constructing an instance of an AlphaRegion. With reference to FIG. 3A, the first approach is to construct an AlphaRegion A (330) directly from various primitive shapes, including a rectangle, ellipse, polygon, or path, (310) using the methods (320) supplied in the AlphaRegion class itself.

Figure 3B:
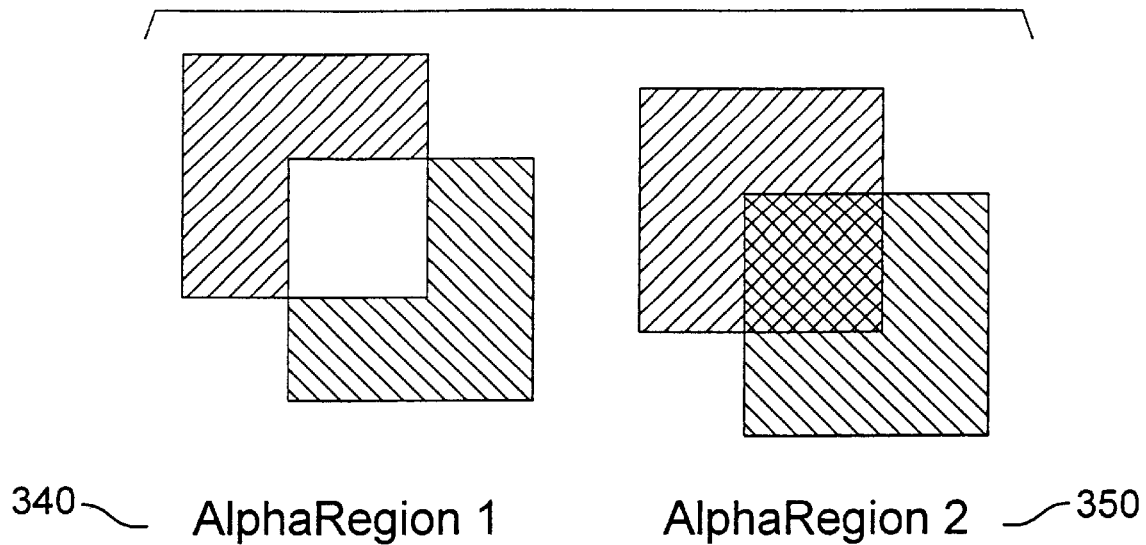
FIG. 3B is a block diagram illustrating an implementation of methods of combining two AlphaRegions representing two rectangles, in both alternate and inding mode.

In the case of a polygon (a special case of a path) or path, an implementation of AlphaRegion can render the image of a combination of paths in either of two different fill modes that are known in the art: alternate mode or winding mode. For example, with reference to FIG. 3B, when two intersecting rectangles are rendered in alternate mode, the image of the resulting combination is illustrated by AlphaRegion 1 (340), since each intersecting scan line alternates the filling spans. In winding mode, the image of the resulting combination will depend upon the direction of the rectangles. When the two intersecting rectangles both have a clockwise direction, the image of the resulting combination is illustrated by AlphaRegion 2 (350). Alternatively, if the direction of the second rectangle is counter-clockwise, the image of the resulting combination is AlphaRegion 1 (340), the same as for alternate mode. Accordingly, different fill modes and directions of the arbitrary 2-dimensional shapes may be supported in an implementation of the AlphaRegion filling operations.

Figure 5A:
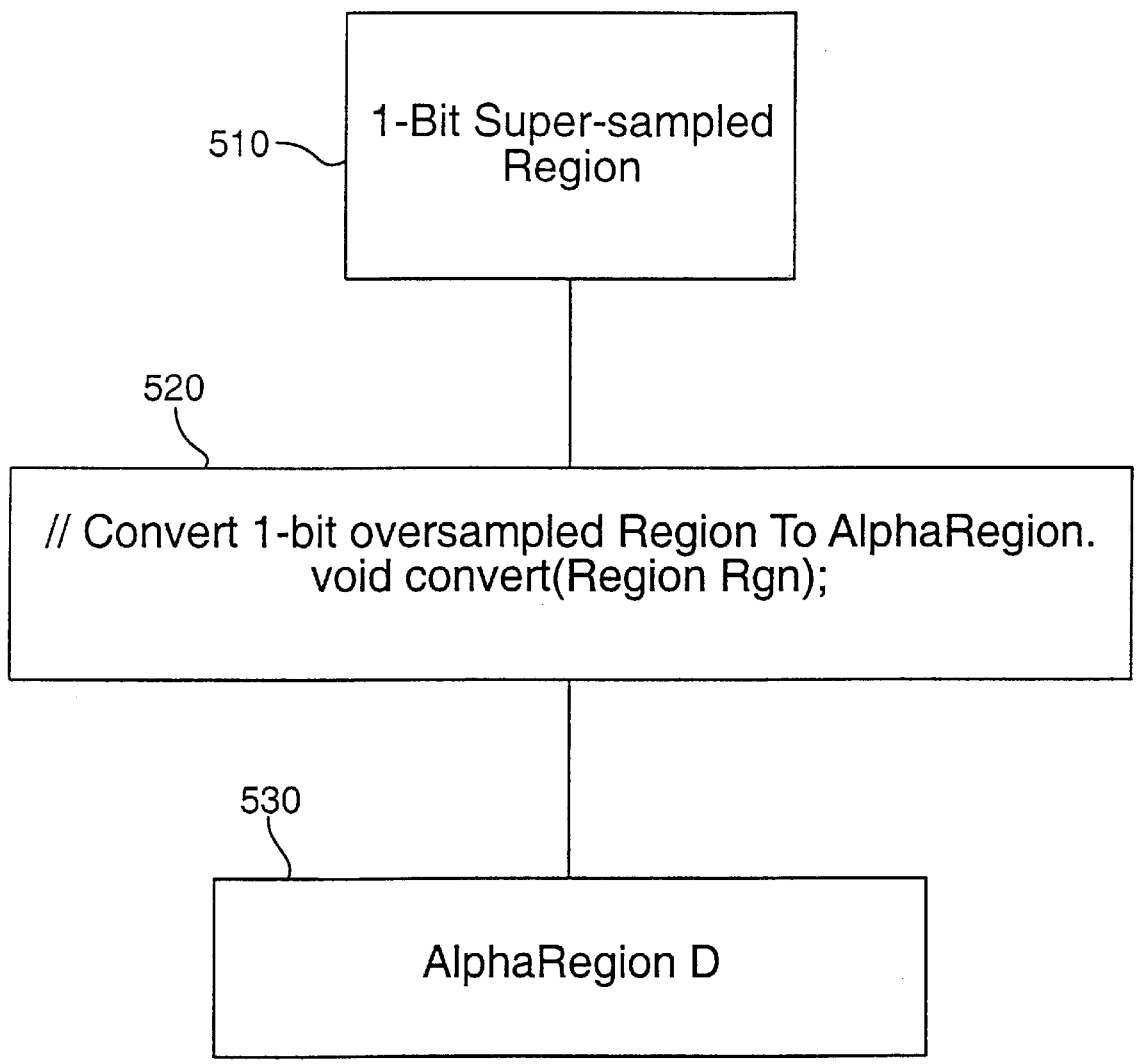
FIG. 5A is a block diagram illustrating an implementation of onstructing an AlphaRegion from a conventional 1-bit super-sampled Region.

With reference to FIG. 5A, a second approach to constructing an AlphaRegion is to convert a super-sampled 1-bit Region (510) into an AlphaRegion D (530) using a conversion method (520) supplied in the AlphaRegion class itself.

Figure 5B:
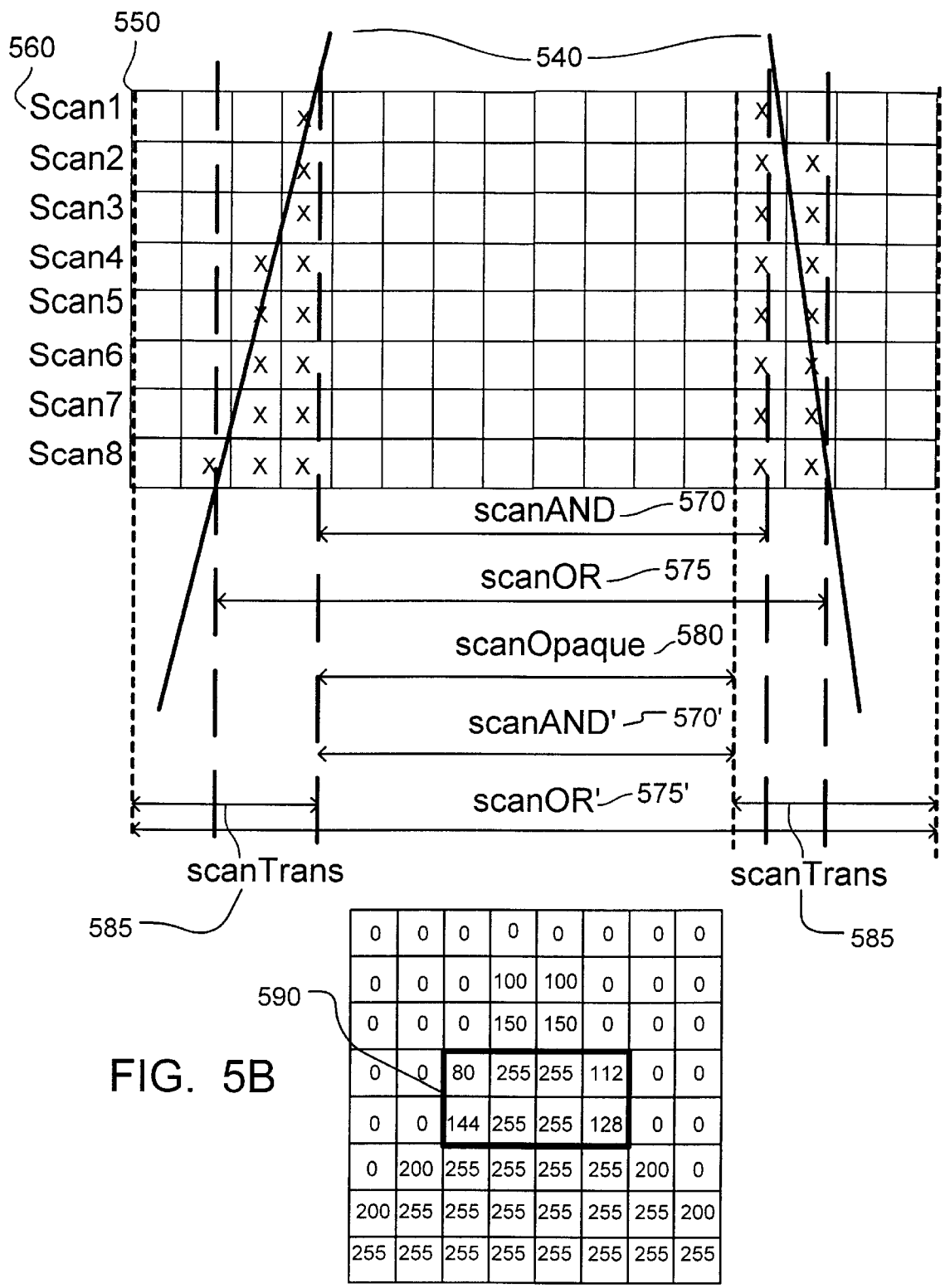
FIG. 5B is a detailed illustration of an implementation of constructing n AlphaRegion from a super-sampled bitmap.

A third approach to constructing an AlphaRegion is to record the alpha image data structure directly from a super-sampled bitmap image (550), as is illustrated in detail in FIG. 5B. In each of the implementations illustrated in FIGS. 3, 5A and 5B, the alpha values are not part of the image data source itself. Rather, they must be derived from the image data generated for the shape.

In the example illustrated in FIG. 5B, the bitmap image (550) is super-sampled at the rate of four scan lines per pixel in both the x and y directions. Thus, each pixel of the bitmap image (550) is represented by 16 sub-pixels in a 4×4 grid. Only the sampling frequency in the y-direction will affect performance of the creation of an AlphaRegion.

The arbitrary 2-dimensional shape is represented in the bitmap image (550) by the presence of the boundaries (540) of the graphics primitive. The y-direction sub-scan lines are referred to as Scan1, Scan2, etc. (560), and the span of each sub-scan line (560) is the width between the left-most and right-most boundary (540), to within the nearest sub-pixel.

In order to determine which pixels of the bitmap image (550) are semi-transparent, the illustrated implementation of the method first determines the span of the sub-scan lines (560). The sub-scan lines of a given row of pixels are next classified as either an interior sub-scan line, or an exterior sub-scan line. The interior sub-scan line is defined as the shortest sub-scan line within the boundaries (540) in a sampled row of pixels, and the exterior sub-scan line is defined as the longest sub-scan line with the boundaries (540) in a sampled row of pixels. In the illustrated example, the width of an interior scan line is designated as scanAND (570), and the width of the exterior scan line is designated as scanOR (575). The scanAND (570) and scanOR (575) spans are then quantized to fit within the pixel boundaries of the bitmap image (550). Quantization is performed by expanding the width of the scanOR (575) span to the nearest pixel outside the boundaries (540), and by shortening the scanAND (570) span to the nearest pixel within the boundaries (540).

The illustrated implementation of the method then subtracts the quantized scanAND' (570') span from the quantized scanOR' (575') span, resulting in a new scanTrans (585) span. The scanAND' (570') span itself is the equivalent of the scanOpaque (580) span. The scanTrans (585) span represents the semi-transparent pixels of the bitmap image (550), whereas the scanOpaque (580) span represents the opaque pixels of the bitmap image (550). The computations are summarized as follows:

ScanTrans=scanOR'−scanAND'

ScanOpaque=scanAND'

In one implementation of the method, the alpha values of the semi-transparent pixels falling within the span of scanTrans (585) are calculated by taking the percentage of sub-pixels crossed by the boundaries (540) as compared to the total number of sub-pixels. In the illustrated example, with reference to first pixel in the first row of the bitmap image (550), comprised of sub-scan lines Scan1 through Scan4 (560), the alpha value may be calculated by dividing 5, the total number of crossed sub-pixels, by 16, the total number of sub-pixels, and by multiplying the resulting fraction by 255, the alpha value of an opaque pixel for an 8-bit alpha value. The result is an alpha value of 80. The calculations are summarized below:

((Total Crossed Sub-Pixels)/(Total Sub-Pixels))×Opaque Alpha Value=Alpha Value

In actual practice, the result of the pixel calculations is encoded directly into an alpha image data structure of an AlphaRegion. For purposes of illustration, an approximation of an alpha bit mask representation (590) of the results of the pixel calculations is illustrated in FIG. 5B.

The conversion method (520) for converting a Region to an AlphaRegion works similarly to the method for recording the alpha image data structure directly from a super-sampled bitmap image. More specifically, FIG. 5C illustrates an implementation of conversion method (520) for an arbitrary 2-dimensional shape represented in a bitmap image of a super-sampled 1-bit Region (510). The y-direction sub-scan lines are referred to as Scan1, Scan2, etc. (531), and are as follows:

Scan1=(2, 2), (5, 4), (10, 1)
Scan2=(2, 1), (5, 4), (10, 2)
Scan3=(2, 3), (5, 4), (10, 1)
Scan4=(2, 2), (5, 4), (10, 2)

The exterior and interior scan lines ScanOR and ScanAND (532, 533) are calculated as follows:

scanOR=(2, 7), (10, 2)
scanAND=(2, 1), (5, 4), (10, 1)

The scan lines are quantized as follows:

scanOR'=(1, 12)
scanAND'=(5, 4)

The illustrated implementation of the conversion method (520) then subtracts the quantized scanAND' (535) span from the quantized scanOR' span (534), resulting in a new scanTrans (536) span. The scanAND' (535) span itself is the equivalent of the scanopaque (537) span.

scanTrans=scanOR'−scanAND'=(1, 4), (9, 4)

scanOpaque=scanAND'=(5, 4)

When any of the scan lines are identical, the redundant lines may be ignored. Empty scan lines are, of course, also ignored, since there are no semi-transparent or opaque spans to calculate. The alpha value for each pixel represented in the converted AlphaRegion is calculated as the overage percentage multiplied by the opaque alpha value.

Constructing An AlphaRegion From Sources With Alpha Values

Figure 6:
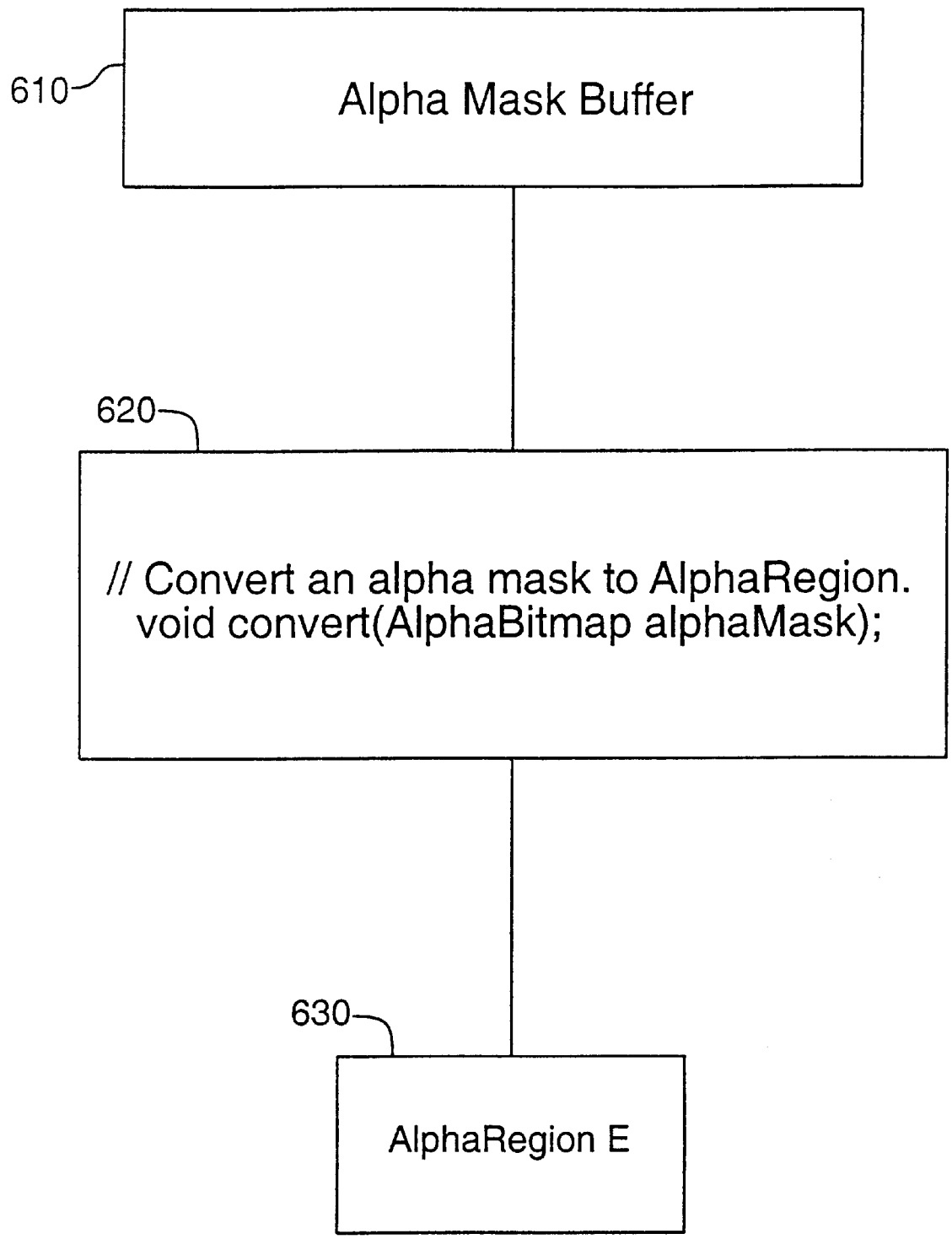
FIG. 6 is a block diagram illustrating an implementation of converting alpha mask buffer into an AlphaRegion.

With reference to FIG. 6, another approach to constructing an AlphaRegion is to convert an alpha mask buffer (610) into an AlphaRegion E (630) using conversion method (620). In contrast to the implementations illustrated in FIGS. 3, 5A and 5B, the alpha values are supplied with the image data source itself and may be encoded directly into the alpha image data structure of an AlphaRegion. When the alpha mask buffer (610) is fairly flat, which means that it contains large areas that are either fully transparent or fully opaque, converting it to AlphaRegion E (630) results in a significant reduction in the use of memory. In contrast, when the alpha mask buffer (610) has a gradient over the entire area, which means that it contains numerous non-redundant semi-transparent areas, converting it to AlphaRegion results in little or no reduction in the use of memory. In the latter case, it is better to use the alpha mask buffer (610) itself to store the image. Since anti-aliased images have a semi-transparent gradient over the boundary portion of an alpha mask buffer (610), AlphaRegion is most efficiently used for storing shapes with narrow anti-aliased boundaries. A further illustration of encoding an alpha image data structure of an AlphaRegion from an alpha mask buffer is set forth immediately below.

Encoding The AlphaRegion Alpha Image Data Structure

Regardless of which method of constructing an AlphaRegion is employed, the method of encoding the data into the alpha image data structure is the same. In an implementation of the method, the alpha image data structure is made up of three arrays. Using the terms previously defined, the first array, yInfo, describes the y-bands, the second array, xInfo, describes the x-patterns, and the third array, alphaData, describes the intensity values (alpha values) in the x-patterns. aInstances of the tables are defined as follows:

| | |
|---|---|
| INT* | yInfo; |
| INT* | xInfo; |
| BYTE* | alphaData; |

The first element of yInfo contains the total number of y-bands: N=yInfo[0]. Each y-band consists of four numbers. The first number is the start value of y, the second number is the height of this y-band, the third number is the offset of xInfo, and the last number is the offset of alphaData. Hence, the data for an implementation of yInfo may be described as follows:

| | |
|---|---|
| yInfo[0,1,2,3] = | N, N_xInfo, N_alphaData, 0 |
| yInfo[4,5,6,7] = | y1, h1, x_offset1, a_offset1, |
| yInfo[8,9,10,11] = | y2, h2, x_offset2, a_offset2, |
| ... | |
| yInfo[4N, 4N+1, 4N+2, 4N+3] = | yN, hN, x_offsetN, a_offsetN | where N_xInfo is the total number of xInfo array elements and N_alphaData is the total number of alphaData array elements. In the implementation, yInfo[3] is unused and set to 0.

The actual x-pattern and aData values corresponding to the "k" y-band are obtained by using the offsets to the xinfo and alphaData arrays defined in yInfo as follows:

x-pattern_k=xInfo+x_offset_k;

aData_k=alphaData+a_offset_k;

Most alpha values occurring in a shape represented as 8-bit alpha data are either 0 or 255, except for the anti-aliased boundaries. The actual values will depend upon the depth of the n-bit alpha data. Hence, the x-pattern is classified according to whether it contains a span of alpha values of only 0s (hereafter referred as "transparent span"), whether the span consists of only 255s (hereafter referred as "opaque span"), or whether the span consists of mixture of values (hereafter referred as "semi-transparent span"). Since the fully transparent span is outside of an AlphaRegion, it is not recorded. Therefore, only the fully opaque spans and semi-transparent spans are recorded.

The x-pattern is stored in the xinfo array as a series of x-spans. The total number of x-spans in an x-pattern and the total number of semi-transparent alphas in the current y-band are recorded at the beginning of the series. Each x-span is expressed as pair of values representing the x-coordinate starting location and width of the span of semi-transparent or opaque alpha values. In order to differentiate a semi-transparent span from an opaque span, the sign of the width in the semi-transparent span is negative. The width of the opaque span remains positive. The actual alpha values appearing in the x-pattern are stored in the alphaData array. Only the alpha values of the semi-transparent x-spans are recorded. The alpha value of the opaque x-span defaults to the value 255.

Referring to the example implementation of an arbitrary 2-dimensional anti-aliased shape (210) illustrated in FIG. 2, a y-band Y1 (220) represents a set of contiguous rows of pixels within a rectangular area that all have the same pattern of opacity levels in the x-direction, identified in AlphaRegion as an x-pattern. The height of the y-band, referred to in FIG. 2 as the variables H1, H2, etc.(250) is represented by the number of rows it contains. As noted earlier, an opacity level is sometimes referred to as the coverage of the pixel. The values associated with a particular opacity level, e.g. 128, 232, and 255, as illustrated in FIG. 2 (240), are alpha values.

Each x-pattern is classified as opaque, transparent, or semi-transparent according to the alpha values appearing in the x-pattern. A row of pixels having an x-pattern classified as completely transparent, such as the first row in the grid containing the arbitrary 2-dimensional anti-aliased shape (210) in FIG. 2, is considered outside of AlphaRegion and is not recorded. Furthermore, the alpha values of only the first occurrence of a recurring x-pattern are recorded.

Each span of purely opaque or purely semi-transparent pixels appearing in an x-pattern is recorded according to its starting location, e.g. X1, X2, X3 and X5 (230), and its width, e.g. W2 and W4 (260), representing the width of 2 and 4 pixels in the x-direction. Each recorded span is identified in an AlphaRegion as an x-span. The first pair of values recorded for an x-pattern is the total number of x-spans in a x-pattern, and the total number of semi-transparent alpha values in the current y-band. The alpha values of only the semi-transparent x-spans within a particular x-pattern are recorded; the opaque x-spans are simply assumed to be the default value. In this way, an AlphaRegion eliminates as much redundancy in the recorded data as possible.

Illustrated in FIG. 7 is an example of using the approach of converting an image representing an arbitrary 2-dimensional shape (720) from an alpha mask buffer into an alpha image data structure of an AlphaRegion, as summarily illustrated in FIG. 6. Referring to the graph in FIG. 7, the alpha values of the pixels are shown at locations corresponding to their positions in a 12×12 pixel grid (710). This arrangement of pixels is analogous to the pixels in an alpha mask buffer (610). The first four elements of the yInfo array, $yInfo_0$ are reserved for storing the total number of y-bands, xInfo elements and alphaData elements. Assuming that the rows are scanned from top to bottom, from row 0 down to row 11 of the grid (710), the first scanned row 0 is completely transparent and is, therefore, not recorded since it is outside the domain of AlphaRegion. The second scanned row 1 of the grid (710), contains semi-transparent alpha values of 100 (730) and results in the construction of y-band $yInfo_1$ element of the yInfo array (740). $yInfo_1$ contains an x-pattern composed of a single x-span of 4 semi-transparent alpha value 100 (730), at starting location 4 (770) in the x-direction. This x-pattern results in the construction in array xInfo (750) the single x-span pair of values (4 , −4) and the first four elements of the alphaData array aData (760) equal to the alpha value 100. Note the width of the $xinfo_1$ span in array xInfo (750) has been set to a negative four (−4). The negative sign indicates that it represents a semi-transparent span. The total number of x-span pairs, 1, and the total number of semi-transparent alphas in the current y-band, 4, is stored in array xInfo (750) immediately preceding the single x-span pair of values (4, −4). The first $yInfo_1$ value of the array yInfo (740) is 1, representing the starting location $yInfo_1$ in the y-direction, the second $yInfo_1$ value is 1, representing the height of yInfo, of one row, and the third and fourth values are the offsets (0,0) of the respective first elements of the xInfo and alphaData arrays just constructed.

The next scanned row 2 of the grid (710), also contains semi-transparent values and results in the construction of y-band $yInfo_2$ in the array yInfo (740). Array element $yInfo_2$ contains an x-pattern also of length 4 and three x-spans. The first and third x-spans are composed of the single semi-transparent value of 150, and the second span is composed of two fully opaque alpha values of 255. This x-pattern results in the construction in array xInfo (750) three x-span pairs of values (4, −1), (5,2), (7, −1). The total number of x-span pairs and total number of alpha values (3,2) is stored in xInfo immediately preceding the three x-span pairs of values. Again, note the width of the semi-transparent x-spans has been set to a negative one (−1). The opaque x-span's width remains the positive value two (2). The two single x-span values are recorded as the next two elements of the alphaData array (760) aData set equal to alpha values 150 and 150. The starting location, height and offset values of y-band $yInfo_2$ are determined similarly to $yInfo_1$, resulting in setting array yInfo (740) element $yInfo_2$=2, 1, 4, 4, where the first 4 represents the offset to the fourth element of the array xInfo (750) and the second 4 represents the offset to the fourth element of the array alphaData (760) aData.

The following scanned row 3 of the grid (710), results in the construction of y-band $yInfo_3$ element of array yInfo (740), similarly to the construction of $yInfo_2$, resulting in setting the values of element $yInfo_3$ to the integers 3, 1, 12, 6. In array xInfo (750), another three x-span pairs of values (3, −2), (5, 2), (7, −2) are recorded immediately preceded by the total number of x-span pairs, 3, and total number of alpha values, 4. In array alphaData (760) aData, another four elements are recorded as alpha values of 150, 200, 200, and 150. The next two scanned rows 4 and 5 of the grid (710), contain identical x-patterns of pixels, and thus present the first y-band $yInfo_4$ element of array yInfo (740) composed of more than one row. Although the x-pattern values of $yInfo_4$ are slightly different than that of $yInfo_3$, the series of x-span value pairs for the two y-bands are identical. Consequently, the existing xInfo values can be reused to for the $yInfo_4$ y-band. Because the actual alpha values are different, however, additional alpha values in the array alphaData (760) must be recorded, resulting in the recording of the next four alpha values of aData, 150, 225, 225, and 150. The D resulting y-band values of yInfo$_4$ element of array yInfo (740) are set to the integers 4, 2, 12 10.

The y-bands yInfo$_5$ and yInfo$_6$ elements of array yInfo (740) are constructed in the same manner as y-bands yInfo$_3$ through yInfo$_4$. Continuing with y-band yInfo$_7$ element of array yInfo (740), note that an x-pattern containing an embedded fully transparent area (alpha value=0) is presented. AlphaRegion does not record the x-span of the x-pattern representing the fully transparent pixels since it is outside the domain of AlphaRegion. Thus, the series of x-spans recorded in the next elements of array xinfo (750) are the pairs of values (3, −2), (7, −2), skipping the fully transparent x-span. Furthermore, AlphaRegion records only the alpha values of the semi-transparent x-spans into an element of the alphaData array (760), resulting in recording the next four elements of aData alpha values as 100, 150, 150, and 100. The resulting y-band values of yInfo$_7$ element of array yInfo (740) are set to 8, 2, 32, 20.

The remaining y-bands, the yInfo$_8$ and yInfo$_9$ elements of array yInfo (740), are notable in that they do not require the construction of any new xInfo (750) or alphaData (760) array elements.

The methods for constructing AlphaRegion and storing a shape in AlphaRegion, as illustrated in FIG. 7, may be implemented in multiple program modules. Depending on a variety of considerations, such as cost, performance and design complexity, each of these modules may be implemented in digital logic circuitry as well.

Rendering AlphaRegion

Once created, AlphaRegion is rendered by filling or clipping the desired area on the drawing surface. Instead of an explicit draw( ) method, the outline of the desired primitive, such as a polygon, is first calculated and then filled or clipped using one of the filling or clipping rendering methods. For example, using the terms defined above, one implementation of rendering an image uses the method of filling AlphaRegion with a certain color, and is illustrated in pseudo code as follows:

```
{
    INT     X, Y, Width, Height;
    INT     numY = yInfo[0]; // This is the total number of y-bands
    INT*    x-pattern;
    BYTE*   aData;
    INT     k = 4;
    While(k <= 4*numY)
    {
        Y = yInfo[k++];
        Height = yInfo[k++];
        x-pattern = xInfo + yInfo[k++];
        aData = alphaData + yInfo[k++];
        ::fillXPattern(surf, height, x_pattern, aData, color);
    }
}
```

The function fillXPattern( ) can be implemented by using fillRect( ) and fillRectWidthAlpha( ) functions as follows:
    void fillXPattern(Surface* surf, INT height, INT* x_pattern, BYTE* aData,
    Color color)
    {
        INT numX=x_pattern[0]; //This is the total number of x-spans in x-pattern
        for(INT n=1; n<=numX; n++)
        {
            INT x=x_pattern[2*n];
            INT width=x_pattern[2*n+1];
            if(width>0) {
                //This is an opaque span.
                ::fillRect(surf, x, y, width, height, color);
            }
            else if(width<0)
            {
                //This is semi-transparent span.
                ::fillRectWidthAlpha(surf, x, y, −width, height, color, aData);
                aData=aData−width; //go to the next span.
            }
        }
    }

Here, fillRect( ) is an existing C-function such as that supported in the Microsoft Windows® GDI graphics subsystem, to fill the given surface with the given color within the given rectangle. The illustrated implementation of the method of the AlphaRegion object of the invention, fillRectWithAlpha( ), is similar, but it uses the alpha values given by array aData. Here, fillRectWithAlpha( ) is similar to fillRect( ) but it uses the alpha values given by array aData. At the alpha value at location x+k (where k=0, 1, . . . ,−width−1), the alpha value of aData[k] is used in filling.

Similarly, when filling an image within this AlphaRegion (instead of a primitive such as a rectangle), functions fillImage( ) and fillImageWithAlpha( ) may be used instead. They are similar to functions fillRect( ) and fillRectWithAlpha( ), except that they take a pointer for the image. In actual implementation of fill( ), either fillRect( ) or fillRectWithAlpha( ) may not be called for each x-span. Instead, the existing optimized methods for filling a scan band may be used and called in each band.

Most computer graphics systems have a function call equivalent to fillRect( ) and fillRectWithAlpha. In such systems, the filling method of AlphaRegion may be implemented without writing the low-level rendering functions. However, in order to optimize the fillXPattern( ) function call, a customized low-level rendering function may optionally be used in an implementation of AlphaRegion instead of calling fillRect for each rectangle.

Combining AlphaRegion

Figure 4:
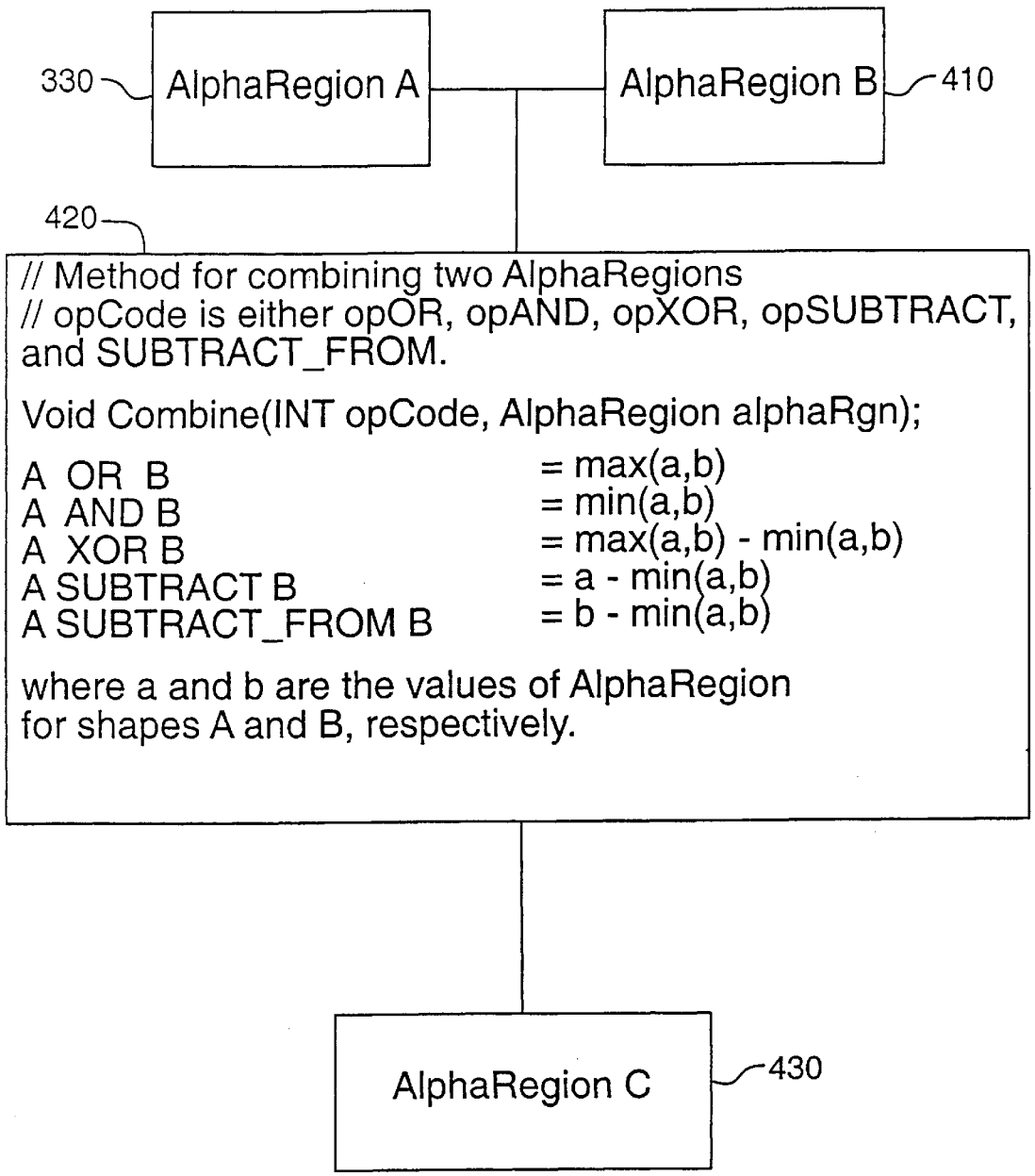
FIG. 4 is a block diagram illustrating an implementation of the ethods for combining an AlphaRegion such as that shown in FIG. 3 with a second lphaRegion.

With reference to FIG. 4, two existing AlphaRegions A (330) and B (410), may be combined to create a third composite AlphaRegion C (430) using combination methods (420) supplied in AlphaRegion, including AND, OR, XOR, SUBTRACT and SUBTRACT_FROM. The illustrated implementation in FIG. 4, shows the case of NonCounting mode, as explained below.

The value of a pixel in a composited image is computed from the component images, depending upon the component image's transparency values. For example, if the foreground image is opaque, then the composited pixel's value is taken from the foreground image. On the other hand, if the foreground image is transparent or semi-transparent, then the composited pixel's value may be a combination of both the foreground and background pixel values. Compositing an image from two anti-aliased images thus requires that the alpha data associated with each pixel be part of the calculation.

There are a number of existing techniques for compositing images. For example, the compositing of images in compressed form may be accomplished by performing combination operations such as AND, OR, XOR and DIFF on the compressed images. In the context of existing Region memory structures, this type of compositing is fairly straightforward, since a pixel is only either fully transparent or fully opaque. This type of compositing has also been applied to bitmaps using run-length encoding.

These existing methods may provide satisfactory results for some types of images. However, the ability to directly combine or subtract an anti-aliased image in compressed form is unavailable in the existing art. For example, Region is unable to store an image representing an anti-aliased image. In order to successfully construct a composite image from anti-aliased images, Region requires the use of the alpha data outside of Region.

Thus it is advantageous to devise a method for applying combination operations to bitmaps incorporating alpha data. This presents a challenge not addressed by existing compositing techniques. AlphaRegion addresses these challenges by structuring the compressed alpha data into an alpha image data structure of AlphaRegion that can be directly manipulated with combination operators.

When combining two semi-transparent rectangles, AlphaRegion addresses two different scenarios. The first scenario is to calculate the combined AlphaRegion without considering the overlapping effects. If two AlphaRegions have the same alpha values, there is no problem when combining (OR) them. In the second scenario, when the two semi-transparent region overlaps, the intersected region becomes more opaque. This scenario is the source-over effect that is commonly used in alpha blending.

In an implementation of AlphaRegion, the application programming interface of the combination operations is as follows:

void AlphaRegion::combine(INT opCode, AlphaRegion* rgnB, INT countingMode=NonCounting);

The default value for countingMode is set to NonCounting (the first scenario).

In the illustrated implementation, two AlphaRegions representing shapes A and B may be combined. The combine mode (opCode) may be OR, AND, XOR, SUBTRACT, or SUBTRACT_FROM. Let a and b denote the normalized alpha values of the region A and the region B at a particular point. Both opaque values of a and b are set to 1. In NonCounting mode:

| | |
|---|---|
| A OR B = | max(a, b) |
| A AND B = | min(a, b) |
| A XOR B = | max(a, b)−min(a, b) |
| A SUBTRACT B = | a− min(a, b) |
| A SUBTRACT_FROM B = | b− min(a, b) |

In Counting mode:

| | |
|---|---|
| A OR B = | a+b−ab |
| A AND B = | ab |
| A XOR B = | (a+b−ab)(1−ab) |
| A SUBTRACT B = | a(1−b) |
| A SUBTRACT_FROM B = | (1−a)b |

Note that the OR, AND, SUBTRACT, and SUBTRACT_FROM combination operators correspond to Porter-Duff's source-over, in, and out operators.

Figure 8A:
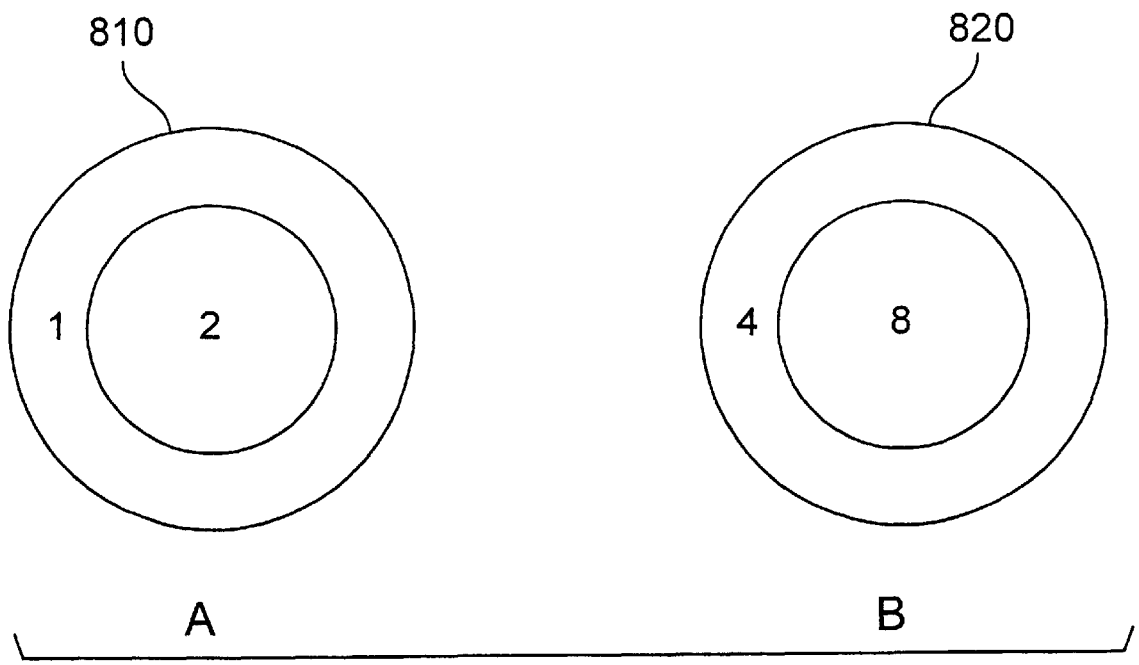
FIGS. 8A and 8B are set diagrams illustrating the composition of two phaRegions having opaque and semi-transparent areas.

The derivation of the boolean operations of AlphaRegion is described in terms of sets of numbers organized according to whether they are transparent or opaque. For example, referring to FIG. 8A, two AlphaRegions are diagrammed into their transparent and opaque portions. AlphaRegion A (810) is a circular region having an opaque center and a transparent boundary. Likewise, AlphaRegion B (820) is a circular region having an opaque center and a transparent boundary. Assign the following numbers to the transparent and opaque areas of AlphaRegions A and B:

| | |
|---|---|
| 1 → A's transparent part | } → $q_A$ |
| 2 → A's opaque part | |
| 4 → B's transparent part | } → $q_B$ |
| 8 → B's opaque part | |

Figure 8B:
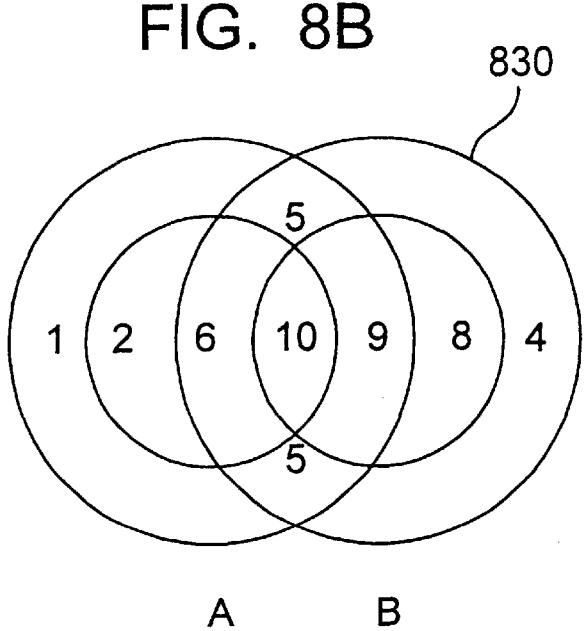

The compositing of AlphaRegion A (810) with AlphaRegion B (820) results in composited AlphaRegion areas (830) designated with the numbers 1, 2, 4, 5, 6, 8, 9, 10 as illustrated in FIG. 8B.

$$q_A + q_B = \left\{\begin{matrix}0\\1\\2\end{matrix}\right\} + \left\{\begin{matrix}0\\4\\8\end{matrix}\right\} = \left\{\begin{matrix}0 & 4 & 8\\1 & 5 & 9\\2 & 6 & 10\end{matrix}\right\}$$

Using the numbers of the composited areas 1, 2, 4, 5, 6, 8, 9, and 10, (830), as illustrated in FIG. 8B, the combination operations performed on AlphaRegion A (810) and AlphaRegion B (820) can be illustrated using set notation as follows:

$A \cap B = \{5,6,9,10\}$ $A \cup B = \{11,2,4,5,6,8,9,10\} \leftrightharpoons \neq \{0\}$ $A$ XOR $B = \{1,2,4,5,6,8,9\} \leftrightharpoons \neq \{0,10\}$ $A - B = \{1, 2,5,6\}$ Denote a and b for the values of a specific pixel within the areas of the composited AlphaRegion areas (830). The boolean operations for compositing AlphaRegion A (810) and AlphaRegion B (820) in NonCounting mode can then be expressed as follows:

$A \cup B \rightarrow \max(a,b)$ $A \cap B \rightarrow \min(a,b)$ $A \text{xor} B = A \cup B - A \cap B \rightarrow \max(a,b) - \min(a,b) = |a-b|$ $A - B = A \cap \bar{B} \rightarrow a - \min(a,b)$ $B - A = B \cap \bar{A} \rightarrow b - \min(a,b)$ For Counting mode, the corresponding equations are:

$A \cup B \rightarrow a+b-ab$ $A \cap B \rightarrow ab$ $A$ xor $B = A \cup B - A \cap B \rightarrow (a+b-ab)(1-ab)$ $A - B = A \cap \bar{B} \rightarrow a(1-b)$ $B - A = B \cap A(1-a)b$ By defining the boolean operations above, the logical relationships between the AlphaRegions are preserved in both Counting and NonCounting modes as is illustrated below:

$\overline{A} = 1-a$ where the alpha value is normalized to 1

$\overline{(A \cap B)} = \overline{A} \cup \overline{B}$ $\overline{(A \cup B)} = \overline{A} \cap \overline{B}$ AlphaRegion Methods The AlphaRegion class has the followin; methods:
//Constructor/Destructor
   AlphaRegion( );
   AlphaRegion( );
//Methods for recording a AlphaReegion
   void open(INT fillMode=opEOFILL); //Start recording.
   void close( ); //End recording.
   void addRect(REAL x, REAL y, REAL width, REAL height);
   void addRect(RectD* rect);
   void addEllipse(REAL x, REAL y, REAL width, REAL height);
   void addEllipse(RectD* rect);
   void addPolygon(PointD* pts, INT count);
   void addPath(Path* path);
//Combining two AlphaRegions
//opCode is either OR, AND, XOR, SUBTRACT, or SUBTRACT_FROM.
//countingMode is either NonCounting or Counting.
   void combine(INT opCode, AlphaRegion* rgnB, INT countingMode=NonCounting);
//Rendering
   void fill(Color color, Surface* surface);
//Convert 1-bit oversampled Region to AlphaRegion.
   void convert(Region rgn);
//Convert an alpha mask to AlphaRegion.
   void convert(AlphaBitmap alphaMask);

Brief Overview of a Computer System

Figure 9:
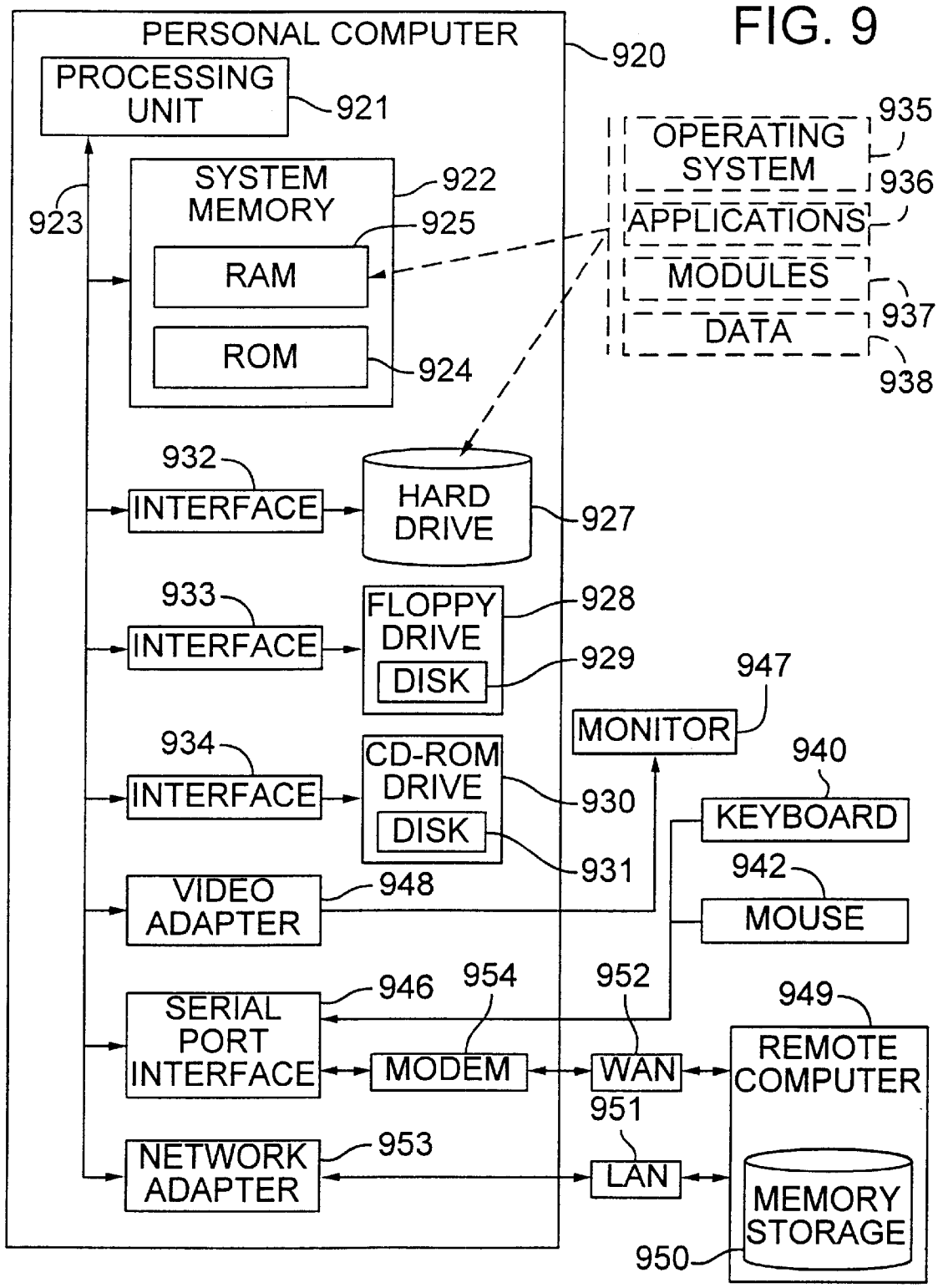
FIG. 9 is a block diagram of a computer system that serves as an operating environment for an implementation of the invention.

FIG. 9 and the following discussion are intended to provide a brief, general description of a suitable computing environment in which the invention may be implemented. Although the invention or aspects of it may be implemented in a hardware device, the tracking system described above is implemented in computer-executable instructions organized in program modules. The program modules include the routines, programs, objects, components, and data structures that perform the tasks and implement the data types described above.

While FIG. 9 shows a typical configuration of a desktop computer, the invention may be implemented in other computer system configurations, including hand-held devices, multiprocessor systems, microprocessor-based or programmable consumer electronics, minicomputers, mainframe computers, and the like. The invention may also be used in distributed computing environments where tasks are performed by remote processing devices that are linked through a communications network. In a distributed computing environment, program modules may be located in both local and remote memory storage devices.

FIG. 9 illustrates an example of a computer system that serves as an operating environment for the invention. The computer system includes a personal computer 920, including a processing unit 921, a system memory 922, and a system bus 923 that interconnects various system components including the system memory to the processing unit 921. The system bus may comprise any of several types of bus structures including a memory bus or memory controller, a peripheral bus, and a local bus using a bus architecture such as PCI, VESA, Microchannel (MCA), ISA and EISA, to name a few. The system memory includes read only memory (ROM) 924 and random access memory (RAM) 925. A basic input/output system 926 (BIOS), containing the basic routines that help to transfer information between elements within the personal computer 920, such as during start-up, is stored in ROM 924. The personal computer 920 further includes a hard disk drive 927, a magnetic disk drive 928, e.g., to read from or write to a removable disk 929, and an optical disk drive 930, e.g., for reading a CD-ROM disk 931 or to read from or write to other optical media. The hard disk drive 927, magnetic disk drive 928, and optical disk drive 930 are connected to the system bus 923 by a hard disk drive interface 932, a magnetic disk drive interface 933, and an optical drive interface 934, respectively. The drives and their associated computer-readable media provide nonvolatile storage of data, data structures, computer-executable instructions (program code such as dynamic link libraries, and executable files), etc. for the personal computer 920. Although the description of computer-readable media above refers to a hard disk, a removable magnetic disk and a CD, it can also include other types of media that are readable by a computer, such as magnetic cassettes, flash memory cards, digital video disks, Bernoulli cartridges, and the like.

A number of program modules may be stored in the drives and RAM 925, including an operating system 935, one or more application programs 936, other program modules 937, and program data 938. A user may enter commands and information into the personal computer 920 through a keyboard 940 and pointing device, such as a mouse 942. Other input devices (not shown) may include a microphone, joystick, game pad, satellite dish, scanner, or the like. These and other input devices are often connected to the processing unit 921 through a serial port interface 949 that is coupled to the system bus, but may be connected by other interfaces, such as a parallel port, game port or a universal serial bus (USB). A monitor 947 or other type of display device is also connected to the system bus 923 via an interface, such as a display controller or video adapter 948. In addition to the monitor, personal computers typically include other peripheral output devices (not shown), such as speakers and printers.

The personal computer 920 may operate in a networked environment using logical connections to one or more remote computers, such as a remote computer 949. The remote computer 949 may be a server, a router, a peer device or other common network node, and typically includes many or all of the elements described relative to the personal computer 920, although only a memory storage device 50 has been illustrated in FIG. 9. The logical connections depicted in FIG. 5 include a local area network (LAN) 951 and a wide area network (WAN) 952. Such networking environments are commonplace in offices, enterprise-wide computer networks, intranets and the Internet.

When used in a LAN networking environment, the personal computer 920 is connected to the local network 951 through a network interface or adapter 953. When used in a WAN networking environment, the personal computer 920 typically includes a modem 954 or other means for establishing communications over the wide area network 952, such as the Internet. The modem 954, which may be internal or external, is connected to the system bus 923 via the serial port interface 946. In a networked environment, program modules depicted relative to the personal computer 920, or portions thereof, may be stored in the remote memory storage device. The network connections shown are merely examples and other means of establishing a communications link between the computers may be used.

In view of the many possible implementations to which the principles of our invention may be applied, we emphasize that the implementations described above are only examples of the invention and should not be taken as a limitation on the scope of the invention. Rather, the scope of the invention is defined by the following claims. We therefore claim as our invention all that comes within the scope and spirit of these claims.

We claim:

1. A method for storing and processing arbitrary 2-dimensional shapes in a graphics system, comprising:
   creating an alpha image data structure from an image data source, wherein the alpha image data structure comprises the following elements:
      data representing the starting location and extent of a span of pixels of a scanned image of a shape, wherein the span of pixels is semi-transparent;
      data representing the alpha values quantifying the opacity of each pixel of the semi-transparent span;
   combining the alpha image data structure with a second alpha image data structure, wherein the second alpha image data structure represents a second image data source;
   storing the combined alpha image data structures in a third alpha image data structure; and
   rendering the third alpha image data structure onto a drawing surface;
   wherein creating an alpha image data structure from an image data source further comprises:
      recording the number of adjacent spans having an identical pattern of alpha values that comprise the arbitrary 2-dimensional shape in the alpha image data structure;
      classifying each span or portion of a span as semi-transparent or opaque, and storing the starting location and extent of each span or portion of a span in the alpha image data structure, wherein the extent is stored as a positive number if the span or portion of a span is opaque, and is stored as a negative number if the span or portion of a span is semi-transparent;
      recording the alpha values associated with the semi-transparent spans or portions of spans, in the alpha image data structure, wherein only the first occurrence of an identical pattern of alpha values occurring within the arbitrary 2-dimensional shape is recorded;
      recording the location of the semi-transparent or opaque spans and portions of spans in a first offset of the alpha image data structure;
      recording the location of the alpha data for the adjacent span having an identical pattern of alpha values in a second offset of the alpha image data structure.

2. A method for storing and processing arbitrary 2-dimensional shapes in a graphics system, comprising:
   creating an alpha image data structure from an image data source, wherein the alpha image data structure comprises the following elements:
      data representing the starting location and extent of a span of pixels of a scanned image of a shape, wherein the span of pixels is semi-transparent;
      data representing the alpha values quantifying the opacity of each pixel of the semi-transparent span;
   combining the alpha image data structure with a second alpha image data structure, wherein the second alpha image data structure represents a second image data source;
   storing the combined alpha image data structures in a third alpha image data structure; and
   rendering the third alpha image data structure onto a drawing surface;
   wherein combining two alpha image data structures flrther comprises:
      compositing the alpha values of the pixel defined by the first alpha image data structure with the corresponding pixel from the second alpha image data structure and performing an OR combination operation on the alpha values of the respective pixels, wherein the OR operation selects the alpha value having the largest value.

3. The method of claim 2 wherein compositing the alpha values is performed in a counting mode, in order to accommodate the overlapping of a semi-transparent scanned image of the first image data source with a semi-transparent scanned image of the second image data source.

4. A method for storing and processing arbitrary 2-dimensional shapes in a graphics system, comprising:
   creating an alpha image data structure from an image data source, wherein the alpha image data structure comprises the following elements:
      data representing the starting location and extent of a span of pixels of a scanned image of a shape, wherein the span of pixels is semi-transparent;
      data representing the alpha values quantifying the opacity of each pixel of the semi-transparent span;
   combining the alpha image data structure with a second alpha image data structure, wherein the second alpha image data structure represents a second image data source;
   storing the combined alpha image data structures in a third alpha image data structure; and
   rendering the third alpha image data structure onto a drawing surface;
   wherein combining two alpha image data structures further comprises:
      compositing the alpha values of the pixel defined by the first alpha image data structure with the corresponding pixel from the second alpha image data structure and performing an AND combination operation on the alpha values of the respective pixels, wherein the AND operation selects the alpha value having the smallest value.

5. The method of claim 4 wherein compositing the alpha values is performed in a counting mode, in order to accommodate the overlapping of a semi-transparent scanned image of the first image data source with a semi-transparent scanned image of the second image data source.

6. A method for storing and processing arbitrary 2-dimensional shapes in a graphics system, comprising:
   creating an alpha image data structure from an image data source, wherein the alpha image data structure comprises the following elements:
      data representing the starting location and extent of a span of pixels of a scanned image of a shape, wherein the span of pixels is semi-transparent;
      data representing the alpha values quantifying the opacity of each pixel of the semi-transparent span;

combining the alpha image data structure with a second alpha image data structure, wherein the second alpha image data structure represents a second image data source;

storing the combined alpha image data structures in a third alpha image data structure; and rendering the third alpha image data structure onto a drawing surface;

wherein combining two alpha image data structures further comprises:

compositing the alpha values of the pixel defined by the first alpha image data structure with the corresponding pixel from the second alpha image data structure and performing an XOR combination operation on the alpha values of the respective pixels, wherein the XOR operation subtracts the alpha value having the smallest value from the alpha value having the largest value.

7. The method of claim 6 wherein compositing the alpha values is performed in a counting mode, in order to accommodate the overlapping of a semi-transparent scanned image of the first image data source with a semi-transparent scanned image of the second image data source.

8. A method for storing and processing arbitrary 2-dimensional shapes in a graphics system, comprising:

creating an alpha image data structure from an image data source, wherein the alpha image data structure comprises the following elements:

data representing the starting location and extent of a span of pixels of a scanned image of a shape, wherein the span of pixels is semi-transparent;

data representing the alpha values quantifying the opacity of each pixel of the semi-transparent span;

combining the alpha image data structure with a second alpha image data structure, wherein the second alpha image data structure represents a second image data source;

storing the combined alpha image data structures in a third alpha image data structure; and rendering the third alpha image data structure onto a drawing surface;

wherein combining two alpha image data structures further comprises:

compositing the alpha values of the pixel defined by the first alpha image data structure with the corresponding pixel from the second alpha image data structure and performing a SUBTRACT combination operation on the alpha values of the respective pixels, wherein the SUBTRACT operation subtracts the alpha value having the smallest value from the alpha value of the first alpha image data structure.

9. The method of claim 8 wherein compositing the alpha values is performed in a counting mode, in order to accommodate the overlapping of a semi-transparent scanned image of the first image data source with a semi-transparent scanned image of the second image data source.

10. A method for storing and processing arbitrary 2-dimensional shapes in a graphics system, comprising:

creating an alpha image data structure from an image data source, wherein the alpha image data structure comprises the following elements:

data representing the starting location and extent of a span of pixels of a scanned image of a shape, wherein the span of pixels is semi-transparent;

data representing the alpha values quantifying the opacity of each pixel of the semi-transparent span;

combining the alpha image data structure with a second alpha image data structure, wherein the second alpha image data structure represents a second image data source;

storing the combined alpha image data structures in a third alpha image data structure; and rendering the third alpha image data structure onto a drawing surface;

wherein combining two alpha image data structures further comprises compositing the alpha values of the pixel defined by the first alpha image data structure with the corresponding pixel from the second alpha image data structure and performing a SUBTRACT_FROM combination operation on the alpha values of the respective pixels, wherein the SUBTRACT_FROM operation subtracts the alpha value having the smallest value from the alpha value of the second alpha image data structure.

11. The method of claim 10 wherein compositing the alpha values is performed in a counting mode, in order to accommodate the overlapping of a semi-transparent scanned image of the first image data source with a semi-transparent scanned image of the second image data source.

12. A method comprising:

creating a first alpha image data structure from an image data source, wherein the image data source indicates at least one pixel having a default opacity value, and the first alpha image data structure comprises the following elements:

data representing the starting location and extent of a span of pixels of an image, wherein the span of pixels is semi-transparent; and data representing the alpha values quantifying the opacity of pixels of the semi-transparent span; and combining the first alpha image data structure with a second alpha image data structure, wherein pixels having the default opacity value are represented in the first alpha image data structure without storing an alpha value therefor, and pixels having the default opacity value are represented in the second alpha image data structure without storing an alpha value therefor.

13. The method of claim 12 wherein the first alpha image data structure represents a foreground image and the second alpha image data structure represents a background image, and the combining results in a combination of the foreground image with the background image.

14. The method of claim 12 wherein the default opacity value indicates an opaque alpha value.

15. A method of combining a first alpha image data structure having a plurality of semi-transparent alpha values with a second alpha image data structure having a plurality of semi-transparent alpha values, the method comprising:

combining the first alpha image data structure with a second alpha image data structure;

wherein the first alpha image data structure represents an image data source indicating at least one pixel having non-semi-transparent opacity;

wherein the second alpha image data structure represents an image data source indicating at least one pixel having non-semi-transparent opacity; and wherein one or more pixels having non-semi-transparent opacity are represented in the first alpha image data structure without storing an alpha value therefor, and one or more pixels having non-semi-transparency opacity are represented in the second alpha image data structure without storing an alpha value therefor.

16. The method of claim 15 wherein the combining comprises:
compositing alpha values of a pixel defined by the first alpha image data structure with a corresponding pixel from the second alpha image data structure via performing an OR combination operation on the alpha values of the respective pixels, wherein the OR operation selects the alpha value having the largest value.

17. The method of claim 16 wherein compositing the alpha values is performed in a counting mode, in order to accommodate the overlapping of a semi-transparent scanned image of the first image data source with a semi-transparent scanned image of the second image data source.

18. The method of claim 15 wherein the combining comprises:
compositing alpha values of a pixel defined by the first alpha image data structure with a corresponding pixel from the second alpha image data structure via performing an AND combination operation on the alpha values of the respective pixels, wherein the AND operation selects the alpha value having the smallest value.

19. The method of claim 18 wherein compositing the alpha values is performed in a counting mode, in order to accommodate the overlapping of a semi-transparent scanned image of the first image data source with a semi-transparent scanned image of the second image data source.

20. The method of claim 15 wherein the combining comprises:
compositing alpha values of a pixel defined by the first alpha image data structure with a corresponding pixel from the second alpha image data structure via performing an XOR combination operation on the alpha values of the respective pixels, wherein the XOR operation subtracts the alpha value having the smallest value from the alpha value having the largest value.

21. The method of claim 20 wherein compositing the alpha values is performed in a counting mode, in order to accommodate the overlapping of a semi-transparent scanned image of the first image data source with a semi-transparent scanned image of the second image data source.

22. The method of claim 15 wherein the combining comprises:
compositing alpha values of a pixel defined by the first alpha image data structure with a corresponding pixel from the second alpha image data structure via performing a SUBTRACT combination operation on the alpha values of the respective pixels, wherein the SUBTRACT operation subtracts the alpha value havinge smallest value from the alpha value of the first alpha image data structure.

23. The method of claim 22 wherein compositing the alpha values is performed in a counting mode, in order to accommodate the overlapping of a semi-transparent scanned image of the first image data source with a semi-transparent scanned image of the second image data source.

24. The method of claim 15 wherein the combining comprises:
compositing the alpha values of a pixel defined by the first alpha image data structure with a corresponding pixel from the second alpha image data structure via performing a SUBTRACT_FROM combination operation on the alpha values of the respective pixels, wherein the SUBTRACT_FROM operation subtracts the alpha value having the smallest value from the alpha value of the second alpha image data structure.

25. The method of claim 24 wherein compositing the alpha values is performed in a counting mode, in order to accommodate the overlapping of a semi-transparent scanned image of the first image data source with a semi-transparent scanned image of the second image data source.

26. The method of claim 15 wherein rendering a shape from the alpha image data structure further comprises:
calculating the outline of the shape according to the starting location and extent of the spans comprising the image; and
filling the calculated outline of the shape according the alpha values in the semi-transparent spans.

27. A method for storing and processing arbitrary 2-dimensional shapes in a graphics system, comprising:
creating an alpha image data structure from an image data source, wherein the alpha image data structure comprises the following elements:
data representing the starting location and extent of a span of pixels of a scanned image of a shape, wherein the span of pixels is semi-transparent; and
data representing the alpha values quantifying the opacity of each pixel of the semi-transparent span;
combining the alpha image data structure with a second alpha image data structure, wherein the second alpha image data structure represents a second image data source; and
storing the combined alpha image data structures in a third alpha image data structure;
wherein creating an alpha image data structure from an image data source further comprises:
recording the number of adjacent spans having an identical pattern of alpha values that comprise the arbitrary 2-dimensional shape in the alpha image data structure;
classifying each span or portion of a span as semi-transparent or opaque, and storing the starting location and extent of each span or portion of a span in the alpha image data structure, wherein the extent is stored as a positive number if the span or portion of a span is opaque, and is stored as a negative number if the span or portion of a span is semi-transparent;
recording the alpha values associated with the semi-transparent spans or portions of spans, in the alpha image data structure, wherein only the first occurrence of an identical pattern of alpha values occurring within the arbitrary 2-dimensional shape is recorded;
recording the location of the semi-transparent or opaque spans and portions of spans in a first offset of the alpha image data structure;
recording the location of the alpha data for the adjacent span having an identical pattern of alpha values in a second offset of the alpha image data structure.

28. A method for storing and processing arbitrary 2-dimensional shapes in a graphics system, comprising:
creating an alpha image data structure from an image data source, wherein the alpha image data structure comprises the following elements:
data representing the starting location and extent of a span of pixels of a scanned image of a shape, wherein the span of pixels is semi-transparent; and
data representing the alpha values quantifying the opacity of each pixel of the semi-transparent span;
combining the alpha image data structure with a second alpha image data structure, wherein the second alpha image data structure represents a second image data source; and storing the combined alpha image data structures in a third alpha image data structure;

wherein combining two alpha image data structures further comprises:

compositing the alpha values of the pixel defined by the first alpha image data structure with the corresponding pixel from the second alpha image data structure and performing an OR combination operation on the alpha values of the respective pixels, wherein the OR operation selects the alpha value having the largest value.

29. The method of claim 28 wherein compositing the alpha values is performed in a counting mode, in order to accommodate the overlapping of a semi-transparent scanned image of the first image data source with a semi-transparent scanned image of the second image data source.

30. A method for storing and processing arbitrary 2-dimensional shapes in a graphics system, comprising:

creating an alpha image data structure from an image data source, wherein the alpha image data structure comprises the following elements:

data representing the starting location and extent of a span of pixels of a scanned image of a shape, wherein the span of pixels is semi-transparent; and data representing the alpha values quantifying the opacity of each pixel of the semi-transparent span;

combining the alpha image data structure with a second alpha image data structure, wherein the second alpha image data structure represents a second image data source; and storing the combined alpha image data structures in a third alpha image data structure;

wherein combining two alpha image data structures further comprises:

compositing the alpha values of the pixel defined by the first alpha image data structure with the corresponding pixel from the second alpha image data structure and performing an AND combination operation on the alpha values of the respective pixels, wherein the AND operation selects the alpha value having the smallest value.

31. The method of claim 30 wherein compositing the alpha values is performed in a counting mode, in order to accommodate the overlapping of a semi-transparent scanned image of the first image data source with a semi-transparent scanned image of the second image data source.

32. A method for storing and processing arbitrary 2-dimensional shapes in a graphics system, comprising:

creating an alpha image data structure from an image data source, wherein the alpha image data structure comprises the following elements:

data representing the starting location and extent of a span of pixels of a scanned image of a shape, wherein the span of pixels is semi-transparent; and data representing the alpha values quantifying the opacity of each pixel of the semi-transparent span;

combining the alpha image data structure with a second alpha image data structure, wherein the second alpha image data structure represents a second image data source; and storing the combined alpha image data structures in a third alpha image data structure;

wherein combining two alpha image data structures further comprises:

compositing the alpha values of the pixel defined by the first alpha image data structure with the corresponding pixel from the second alpha image data structure and performing an XOR combination operation on the alpha values of the respective pixels, wherein the XOR operation subtracts the alpha value having the smallest value from the alpha value having the largest value.

33. The method of claim 32 wherein compositing the alpha values is performed in a counting mode, in order to accommodate the overlapping of a semi-transparent scanned image of the first image data source with a semi-transparent scanned image of the second image data source.

34. A method for storing and processing arbitrary 2-dimensional shapes in a graphics system, comprising:

creating an alpha image data structure from an image data source, wherein the alpha image data structure comprises the following elements:

data representing the starting location and extent of a span of pixels of a scanned image of a shape, wherein the span of pixels is semi-transparent; and data representing the alpha values quantifying the opacity of each pixel of the semi-transparent span;

combining the alpha image data structure with a second alpha image data structure, wherein the second alpha image data structure represents a second image data source; and storing the combined alpha image data structures in a third alpha image data structure;

wherein combining two alpha image data structures further comprises:

compositing the alpha values of the pixel defined by the first alpha image data structure with the corresponding pixel from the second alpha image data structure and performing a SUBTRACT combination operation on the alpha values of the respective pixels, wherein the SUBTRACT operation subtracts the alpha value having the smallest value from the alpha value of the first alpha image data structure.

35. The method of claim 34 wherein compositing the alpha values is performed in a counting mode, in order to accommodate the overlapping of a semi-transparent scanned image of the first image data source with a semi-transparent scanned image of the second image data source.

36. A method for storing and processing arbitrary 2-dimensional shapes in a graphics system, comprising:

creating an alpha image data structure from an image data source, wherein the alpha image data structure comprises the following elements:

data representing the starting location and extent of a span of pixels of a scanned image of a shape, wherein the span of pixels is semi-transparent; and data representing the alpha values quantifying the opacity of each pixel of the semi-transparent span;

combining the alpha image data structure with a second alpha image data structure, wherein the second alpha image data structure represents a second image data source; and storing the combined alpha image data structures in a third alpha image data structure;

wherein combining two alpha image data structures further comprises compositing the alpha values of the pixel defined by the first alpha image data structure with the corresponding pixel from the second alpha image data structure and performing a SUBTRACT_FROM combination operation on the alpha values of the respective pixels, wherein the SUBTRACT_

FROM operation subtracts the alpha value having the smallest value from the alpha value of the second alpha image data structure.

37. The method of claim 36 wherein compositing the alpha values is performed in a counting mode, in order to accommodate the overlapping of a semi-transparent scanned image of the first image data source with a semi-transparent scanned image of the second image data source.

* * * * *

UNITED STATES PATENT AND TRADEMARK OFFICE
CERTIFICATE OF CORRECTION

PATENT NO. : 6,486,888 B1
DATED : November 26, 2002
INVENTOR(S) : Fushiki et al.

It is certified that error appears in the above-identified patent and that said Letters Patent is hereby corrected as shown below:

Column 2,
Line 33, "Windowso" should read -- Windows® --
Line 41 "the 25 value" should read -- the value --

Column 5,
Line 31, "inding" should read -- winding --
Line 34, "ethods" should read -- methods --
Line 35, "lphaRegion" should read -- AlphaRegion --
Line 36, "onstructing" should read -- constructing --
Line 39, "n" should read -- an --
Line 41,. "nverting" should read -- converting --
Line 42, "phaRegion" should read -- AlphaRegion --
Line 44, "converting alpha mask" should read -- converting an alpha mask --
Line 46, "bitrary" should read -- arbitrary --
Line 47, "ructure" should read -- structure --
Line 49, "phaRegions" should read -- AlphaRegions --

Column 13,
Line 6, "yInfo," should read -- $yInfo_1$ --
Line 44, above "{" on Line 45, insert -- void AlphaRegion::fill(Color color, Surface* surf) --

Column 16,
Line 36, "11,2" should read -- 1,2 --

Column 17,
Line 11, "followin;" should read -- following; --
Line 14, "AlphaRegion" should read -- ~AlphaRegion --

UNITED STATES PATENT AND TRADEMARK OFFICE
CERTIFICATE OF CORRECTION

PATENT NO.   : 6,486,888 B1
DATED        : November 26, 2002
INVENTOR(S)  : Fushiki et al.

It is certified that error appears in the above-identified patent and that said Letters Patent is hereby corrected as shown below:

Column 20,
Line 12, "flrther" should read -- further --

Signed and Sealed this

Twenty-fourth Day of May, 2005

JON W. DUDAS
*Director of the United States Patent and Trademark Office*